US008344965B2

(12) United States Patent
Matsumoto

(10) Patent No.: US 8,344,965 B2
(45) Date of Patent: Jan. 1, 2013

(54) HEAD MOUNTED DISPLAY DEVICE

(75) Inventor: Shigeru Matsumoto, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 531 days.

(21) Appl. No.: 12/561,205

(22) Filed: Sep. 16, 2009

(65) Prior Publication Data
US 2010/0073262 A1 Mar. 25, 2010

(30) Foreign Application Priority Data

Sep. 25, 2008 (JP) .................................. 2008-246988

(51) Int. Cl.
G09G 5/00 (2006.01)
(52) U.S. Cl. ...................... 345/8; 345/5; 345/7; 345/156
(58) Field of Classification Search .................. 345/7, 8, 345/156, 163, 173, 204; 359/630
See application file for complete search history.

(56) References Cited

U.S. PATENT DOCUMENTS

| 6,023,372 | A  | * | 2/2000  | Spitzer et al. ................. 359/630 |
| 6,160,666 | A  | * | 12/2000 | Rallison et al. ................ 359/630 |
| 6,204,974 | B1 |   | 3/2001  | Spitzer |
| 6,239,771 | B1 | * | 5/2001  | Usuki et al. ....................... 345/8 |
| 6,433,773 | B1 | * | 8/2002  | Hasuda .......................... 345/156 |
| 6,914,583 | B1 | * | 7/2005  | Chigira ............................. 345/7 |
| 7,173,765 | B2 | * | 2/2007  | Yamasaki ..................... 359/630 |
| 7,719,769 | B2 | * | 5/2010  | Sugihara et al. .............. 359/630 |
| 8,009,421 | B2 | * | 8/2011  | Misawa .................... 361/679.55 |
| 2004/0041790 | A1 | * | 3/2004 | O'Keeffe et al. ............. 345/163 |
| 2004/0113867 | A1 | * | 6/2004 | Tomine et al. .................... 345/8 |
| 2004/0252077 | A1 | * | 12/2004 | Terasaki ............................ 345/8 |
| 2006/0017657 | A1 | * | 1/2006 | Yamasaki ......................... 345/8 |
| 2008/0136916 | A1 | * | 6/2008 | Wolff ............................. 348/169 |
| 2009/0146916 | A1 |   | 6/2009 | Moliton |
| 2010/0182288 | A1 | * | 7/2010 | Misawa ........................ 345/204 |

(Continued)

FOREIGN PATENT DOCUMENTS

EP 08992599 A2 3/1999

(Continued)

OTHER PUBLICATIONS

European Patent Office; Extended European Search Report in European Patent Application No. 09252212.7 mailed Feb. 22, 2010.

(Continued)

Primary Examiner — Thuy Pardo
(74) Attorney, Agent, or Firm — Baker Botts L.L.P.

(57) ABSTRACT

A head mounted display device has a frame. The frame includes a front portion mountable on a nose of a user, and extending to a right side edge of the front portion, and to a left side edge of the front portion, in front of at least one eye of the user, a connection portion connected to an edge portion of at least one of the right and left side edge, and the connection portion extends rearward from the edge portion, and a temple portion configured to be mountable on an ear of the user, rotatably connected to the connection portion, and rotates around a rotation axis. The head mounted display also has an image display unit having an optical system, for generating an image to be displayed at a position viewable by the user, and a retaining mechanism to hold the image display unit within the connection portion.

21 Claims, 15 Drawing Sheets

U.S. PATENT DOCUMENTS

2011/0122084 A1* 5/2011 Jeon et al. .................... 345/173

FOREIGN PATENT DOCUMENTS

| FR | 2894682 A1 | 6/2007 |
|---|---|---|
| JP | H11-119171 A | 4/1999 |
| JP | 2000-249972 A | 9/2000 |
| JP | 2001-305475 A | 10/2001 |
| JP | 2001-522064 T | 11/2001 |
| JP | 2004-061804 A | 2/2004 |
| JP | 2006-135884 A | 5/2006 |
| JP | 2006-217520 A | 8/2006 |
| JP | 2007-148131 A | 6/2007 |
| WO | 2005022237 A1 | 3/2005 |

OTHER PUBLICATIONS

European Patent Office; European Search Report in European Patent Application No. 09252212.7 mailed Dec. 2, 2009.

Japan Patent Office, Notice of Reasons for Rejection for Japanese Patent Application No. 2008-246988 (counterpart Japanese patent application), mailed Sep. 26, 2012. X.

* cited by examiner

HEAD MOUNTED DISPLAY DEVICE

CROSS REFERENCE TO RELATED APPLICATION

This application claims priority from Japanese Patent Application No. 2008-246988, filed on Sep. 25, 2008, the entire subject matter of which is incorporated herein by reference.

BACKGROUND OF THE DISCLOSURE

1. Field of the Disclosure

The invention relates to a head mounted display device, in particular, to a head mounted display device with a detachable image display unit.

2. Description of the Related Art

Various Head Mounted Display devices (hereinafter interchangeably referred to as "HMDs") have been commercialized as portable displays for television, games and personal digital assistants ("PDAs"). In a known HMD, e.g., the HMD disclosed in Japanese Published Unexamined Application 2007-148131 (hereafter interchangeably referred to as "JP 2007-148131"), an eyeglass type HMD is disclosed as an example of HMD. In the eyeglass type HMD, an image display unit is disposed in front of a frame of the eyeglass type HMD such that the image display unit is adjustable in a right-and-left direction. An adopter member, in which a permanent magnet is embedded, is detachably disposed in the upper edges of both a left rim and a right rim that support lens of the eyeglass type HMD. A rail is fixed to the adopter member by the permanent magnet, and a retaining shaft is movably disposed in the rail. The image display unit is fixed to the frame via a holding ring. The holding ring surrounds the image display unit and is fixed to the retaining shaft by a screw nut.

In another known HMD, e.g., the HMD disclosed in U.S. Pat. No. 6,204,974 A (hereinafter interchangeably referred to "U.S. Pat. No. 6,204,974"), another eyeglass type HMD is disclosed. In the eyeglass type HMD, a housing assembly for housing an image display unit is retained in a temple of a frame of the eyeglass type HMD by a clamp assembly that includes a mounting fixture and a clamp. A pair of pins extend from the mounting fixture that is retained in the housing assembly. The pair of pins penetrate the temple from the outside of the temple, and the housing assembly is retained in the temple.

In the eyeglass type HMD disclosed in JP 2007-148131, the image display unit is retained in the frame by retaining means such as the retaining shaft that extends downward from the upper edges of the left rim and the right rim. The retaining means such as the retaining shaft would interrupt a user's front view when the user's view moves from images, displayed on the image display unit, to a large display or document in front of the user.

In the eyeglass type HMD disclosed in U.S. Pat. No. 6,204,974, the housing assembly is retained in the temple. When the frame is mounted on the user, the temple would deform according to the shape of the user's head. The deformation of the temple may shift the position of images displayed on the image display unit.

SUMMARY OF THE DISCLOSURE

Thus, a need has arisen for a HMD that allows clearing the user's front view and suppressing the effect of deformation of the temple on a position of the image display unit relative to the user's view.

In an embodiment of the invention, a head mounted display device comprises a frame, the frame comprising a front portion configured to be mountable on a nose of a user, and extending in a first direction to a right side edge of the front portion, and extending in a second direction to a left side edge of the front portion, in front of at least one eye of the user, a connection portion connected to at least one edge portion of at least one of the right side edge and the left side edge, wherein the connection portion extends in a rearward direction from the at least one edge portion, and a temple portion configured to be mountable on an ear of the user, and rotatably connected to the connection portion, and configured to rotate around a rotation axis extending perpendicularly to the first and second directions. The head mounted display device also comprises an image display unit comprising an optical system and configured to generate an image to be displayed at a position viewable by the user, and a retaining mechanism configured to detachably hold the image display unit at the connection portion.

According to another embodiment of the invention, a head mounted display device comprises a frame, the frame comprising a front portion configured to be mountable on a nose of a user, and extending in a first direction to a right side edge of the front portion, and extending in a second direction to a left side edge of the front portion, in front of at least one eye of the user, a connection portion connected to at least one edge portion of at least one of the right side edge and the left side edge, wherein the connection portion extends in a rearward direction from the at least one edge portion, and a temple portion configured to be mountable on an ear of the user, and rotatably connected to the connection portion, and configured to rotate around a rotation axis extending perpendicularly to the first and second directions. The head mounted display device also comprises a pressing portion extending in a forward direction from the connection portion, an image display unit comprising an optical system and configured to generate an image to be displayed at a position viewable by the user, and a retaining mechanism configured to detachably hold the image display unit between the connection portion and the pressing portion when the temple portion is mounted on the ear of the user.

Other objects, features, and advantages of embodiments of the invention will be apparent to persons of ordinary skill in the art from the following description of embodiments with reference to the accompanying drawings.

BRIEF DESCRIPTION OF THE DRAWINGS

For a more complete understanding of the invention, the needs satisfied thereby, and the objects, features, and advantages thereof, reference now is made to the following description taken in connection with the accompanying drawings.

DESCRIPTION OF THE EMBODIMENTS

Embodiments of the invention and their features and technical advantages may be understood by referring to FIGS. 1-26, like numerals being used for like corresponding portions in the various drawings.

FIGS. 1-23 may refer to an embodiment of the invention, and its features, like numerals being used for corresponding portions in the various drawings. In an embodiment, an image display unit 100 may be a retinal scanning display ("RSD"). The RSD may comprise a light source and a light scanner. In an embodiment of the invention, the light source may be lasers, e.g., RGB lasers, which may emit image light according to received image signals. In an embodiment of the invention, the light scanner may be a mirror, e.g., a galvano mirror. The galvano mirror may two-dimensionally scan the image light to project an image onto a user's retina. A detailed explanation of the internal structure of a known RSD is known in the art, and is omitted here.

Figure 1:
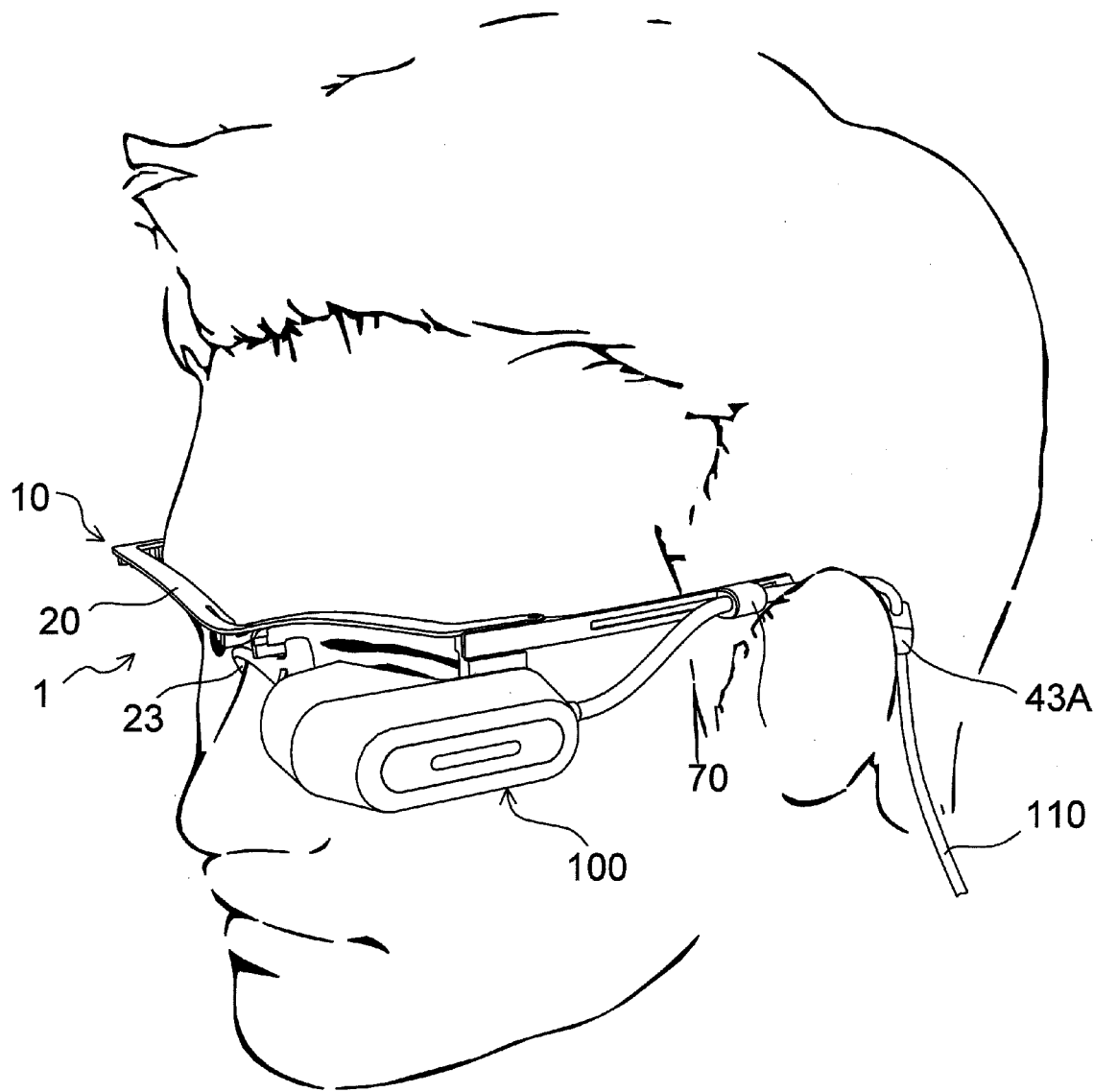
FIG. 1 is a schematic perspective view of a frame 10 mounted on a user according to an embodiment of the invention.
Figure 2:
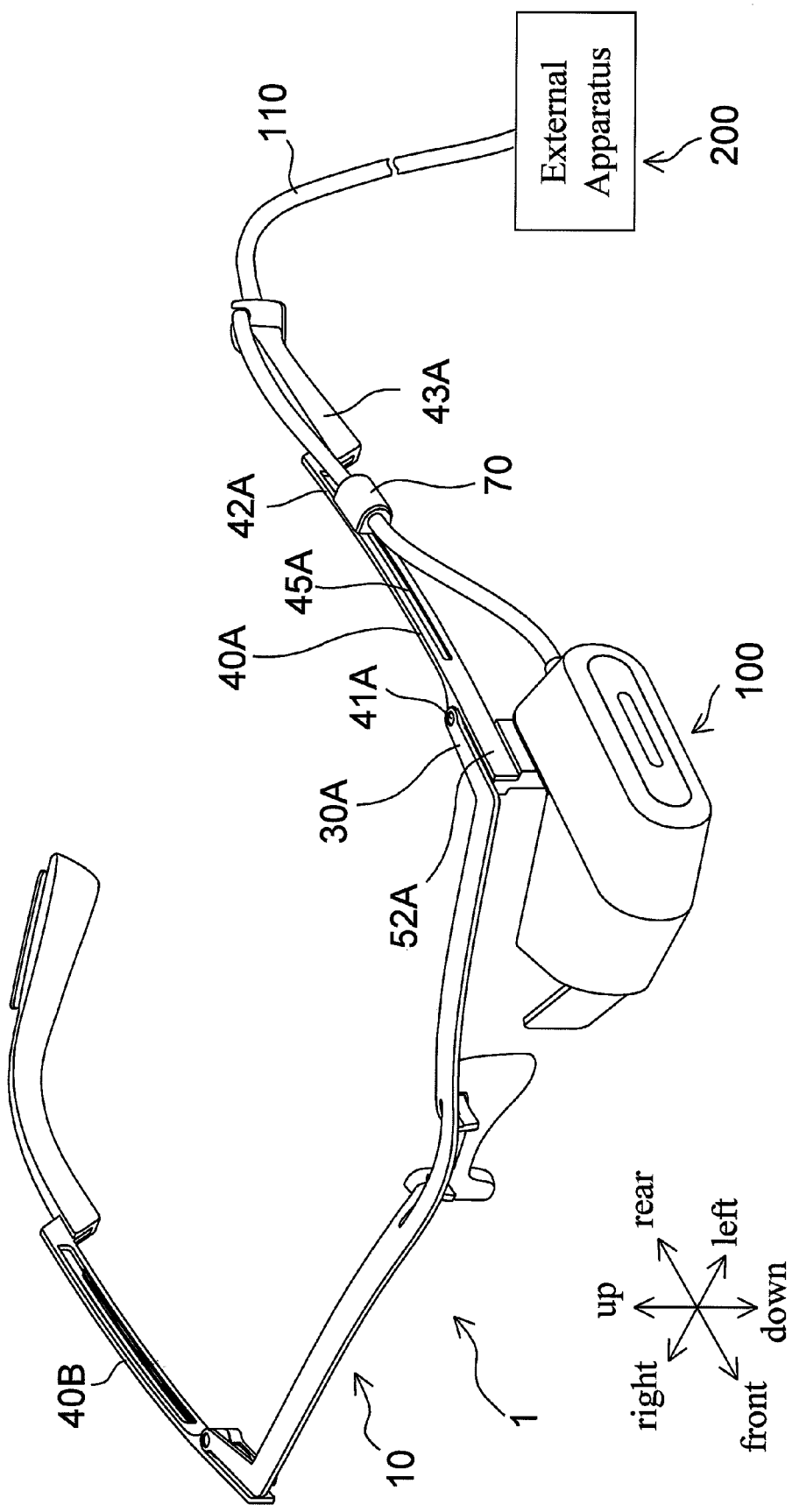
FIG. 2 is a perspective view of an entire structure of an HMD, e.g., HMD 1, according to an embodiment of the invention.

Referring to FIGS. 1-2, a HMD 1 may comprise an eyeglass type frame 10. The image display unit 100 may be mounted on the frame 10. An external apparatus may be connected to the image display unit 100 via a cable 110. In an embodiment, as shown in FIGS. 1-23, an up-and-down direction, a front-and-rear direction, and a right-and-left direction may be defined based on the orientation of the user in FIG. 1. These directions are also shown in FIG. 1 with arrows.

Figure 3:
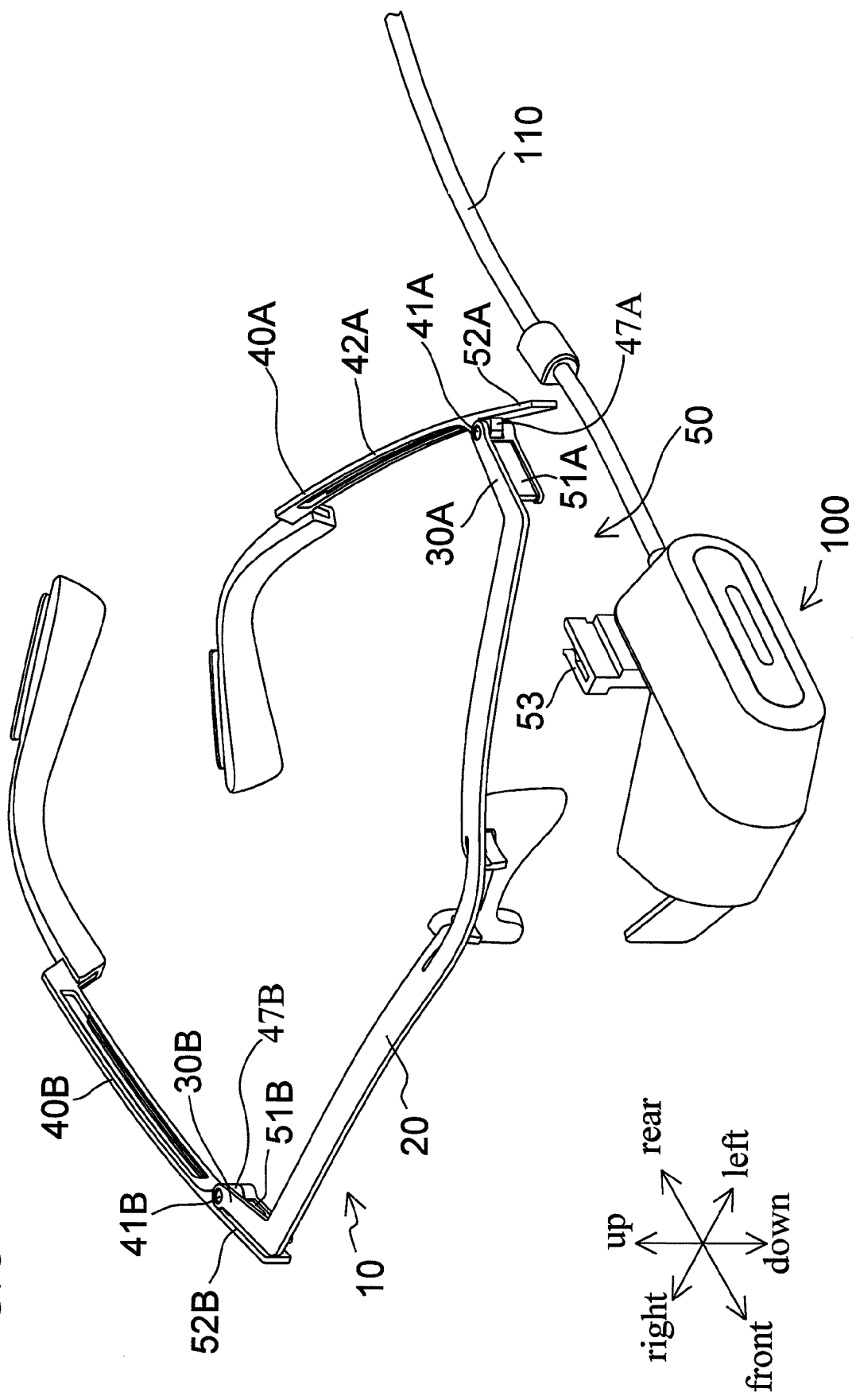
FIG. 3 is a perspective view that describes a state in which an image display unit 100 is detached from the frame 10, according to an embodiment of the invention.

FIGS. 3-6, describe the structure of the frame 10 according to an embodiment of the invention. As shown in FIG. 3, frame 10 may comprise a front portion 20, a left connection portion 30A, a right connection portion 30B, a left temple portion 40A, and a right temple portion 40B.

Figure 5:
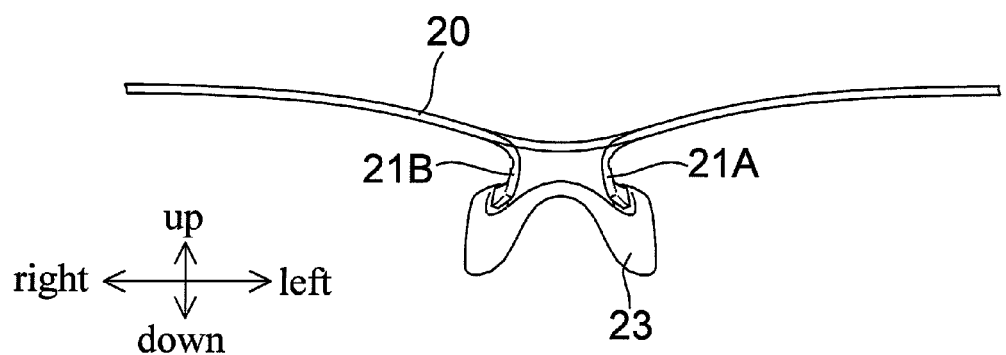
FIG. 5 is a front view of the frame 10 shown in FIG. 4.

As shown in FIG. 5, the front portion 20, which may be mounted on the user as shown in FIG. 1, may extend in the right-and-left direction. The front portion 20 may slope upward from its central portion to a left side edge and a right side edge. A pair of droop portions 21A and 21B may be formed by cutting the central portion of the front portion 20 with a cutting groove 22, and by bending the cut central portion downward. A nose mounting portion 23, fixed to the pair of droop portions 21A and 21B, may be mounted on the user's nose when the frame 10 is mounted on the user.

Figure 4:
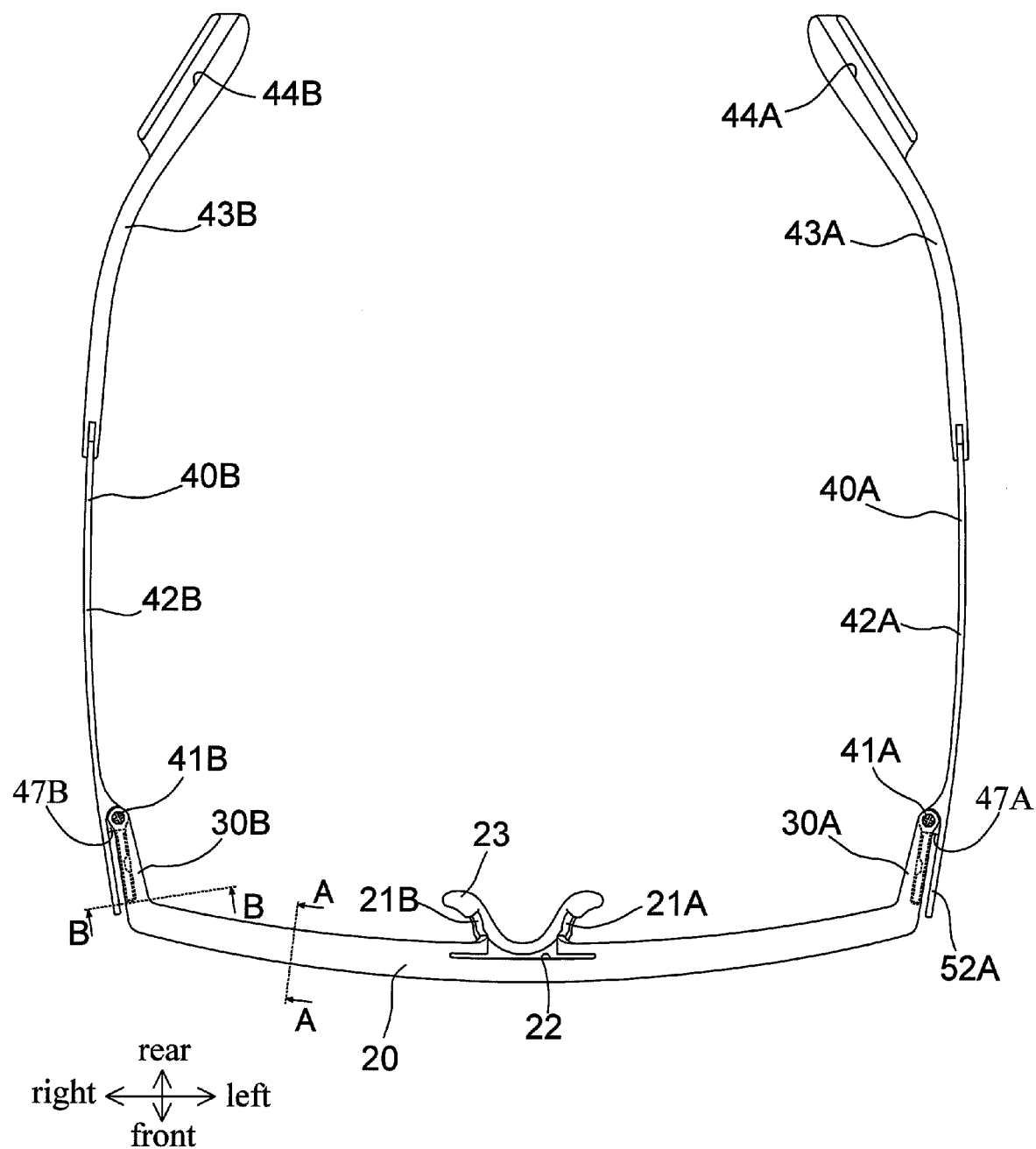
FIG. 4 is a plan view of the frame 10 without the image display unit 100, according to an embodiment of the invention.

As shown in FIG. 4, the connection portions 30A and 30B are fixed to a left side edge and a right side edge of the front portion 20, respectively. The connection portions 30A and 30B may extend in a rearward direction at an angle such that they open to the right-and-left direction. The connection portions 30A and 30B may be integrally formed with the front portion 20. The temple portions 40A and 40B may be rotatably connected to the connection portions 30A and 30B by mounting screws 41A and 41B, which may extend in the up-and-down direction, respectively. Specifically, the temple portions 40A and 40B may be rotatable around rotation axes that extend in the up-and-down direction of the mounting screws 41A and 41B, respectively.

Figure 6:
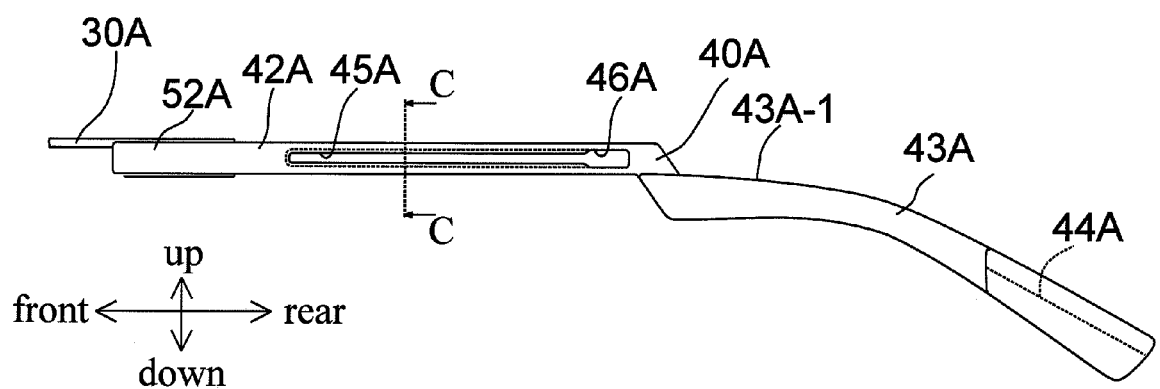
FIG. 6 is a left side view of the frame 10 shown in FIG. 4.

The temple portions 40A and 40B may comprise temple bodies 42A and 42B, ear mounting portions 43A and 43B, cable retaining grooves 44A and 44B for retaining the cable 110, and connection portions 47A and 47B, respectively. FIG. 6 shows the left side temple 40A. Temple portions 40A and 40B are symmetric in their structure. Thus, a detailed description of right side temple 40B is omitted.

The temple body 42A may be rotatably connected to a rear edge portion of the connection portion 30A, via the connection portion 47A, with the mounting screws 41A (see also FIG. 3). The temple body 42A may extend in the front-and-rear direction. An elongated hole 45A, which may be elongated in the front-and-rear direction, may be formed on the temple body 42A. An area in which the elongated hole 45A may be formed may be positioned behind the connection portion 47A. An aperture opening 46A may be integrally formed on a rear edge portion of the elongated hole 45A. The aperture opening 46A may be wider than the elongated hole 45A in the up-and-down direction.

The ear mounting portion 43A, which may be fixed to a rear edge portion of the temple body 42A, may extend in the rearward direction with a downward curvature. As shown in FIG. 4, the ear mounting portions 43A and 43B may become closer to each other in the right-and-left direction as they extend rearward. As shown in FIG. 6, the ear mounting portion 43A may be connected to the temple body 42A at an area lower than the elongated hole 45A. Specifically, an upper surface 43A-1 of the ear mounting portion 43A may be located under an area on which the elongated hole 45A is formed.

As shown in FIG. 4, the cable retaining groove 44A may be formed on a left side surface of the ear mounting portion 43A at a rear edge portion of the ear mounting portion 43A. The left side surface may avoid contacting with a side of the user's head when the frame 10 is mounted on the user.

Figure 7A:
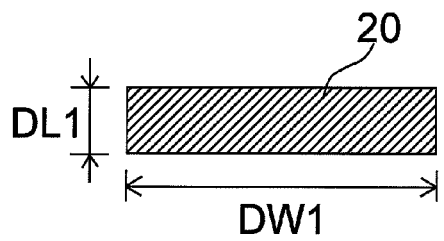
FIG. 7A is a cross-sectional view of a front-portion 20 at the line A-A shown in FIG. 4.
Figure 7B:
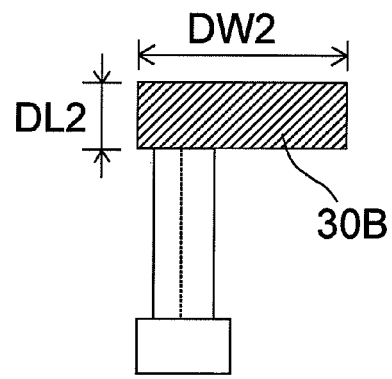
FIG. 7B is a cross-sectional view of a connection portion 30B at the line B-B shown in FIG. 4.

As shown in FIG. 7A, when a cross-sectional shape of the front portion 20 is viewed in a direction perpendicular to a longitudinal direction of the front portion 20, a length in the up-and-down direction, e.g., a height, e.g., height DL1, is smaller than a length in the front-and-rear direction, e.g., a width, e.g., width DW1. Similarly, as shown in FIG. 7B, with respect to temple portion 30B, when cross-sectional shapes of the temple portions 30A and 30B are viewed in a direction perpendicular to a longitudinal direction of the temple portions 30A and 30B, a length in the up-and-down direction, e.g., a height, e.g., the height DL2, is smaller than a length in the right-and-left direction, e.g., a width, e.g., the width DW2. Moreover, as shown in FIG. 7C, with respect to temple body 42A, when cross-sectional shapes of the temple bodies 42A and 42B in a direction perpendicular to a longitudinal direction of the temple bodies 42A and 42B, a length in the up-and-down direction, e.g., a height, is larger than a length in the right-and-left direction, e.g., a width.

Figure 7C:
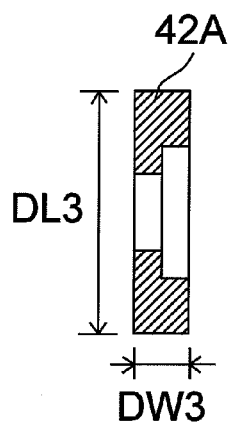
FIG. 7C is a cross-sectional view of a temple body 42A at the line C-C shown in FIG. 6.

As shown in FIG. 7C, the height DL3 is larger than the width DW3. A bending moment around the rotation axes of the mounting screws 41A and 41B is put on the front portion 20 and the connection portions 30A and 30B when the frame 10 is mounted on the user. Since cross-sectional shapes of both the front portion 20 and the connection portions 30A and 30B are larger in ratio of width to height than those of the temple bodies 42A and 42B, the deformation of the front portion 20 and the connection portions 30A and 30B, caused by the bending moment, is small.

As described above, the front portion 20, the connection portions 30A and 30B, and the temple bodies 42A and 42B may have different cross-sectional shapes. Moreover, in an embodiment of the invention, the front portion 20, the connection portions 30A and 30B, and the temple bodies 42A and 42B may comprise different constituent materials. For example, in an embodiment of the invention, front portion 20 and the connection portions 30A and 30B may comprise substantially pure titanium, and the temple bodies 42A and 42B may comprise beta titanium. The Young's modulus, e.g., the longitudinal elastic modulus, of substantially pure titanium is larger than that of beta titanium. Thus, the front portion 20 and the connection portions 30A and 30B may be more rigid against pulling and compression forces than the temple bodies 42A and 42B. Thus, it may be more difficult to deform front portion 20 and connection portions 30A and 30B relative to other portions of the HMD.

In an embodiment of the invention, the nose mounting portion 23 and the ear mounting portions 43A and 43B may directly contact with the user. Thus, these portions may comprise a synthetic resin with an elasticity designed to prevent the user from experiencing uncomfortable feelings when the frame 10 is mounted on the user.

Figure 8:
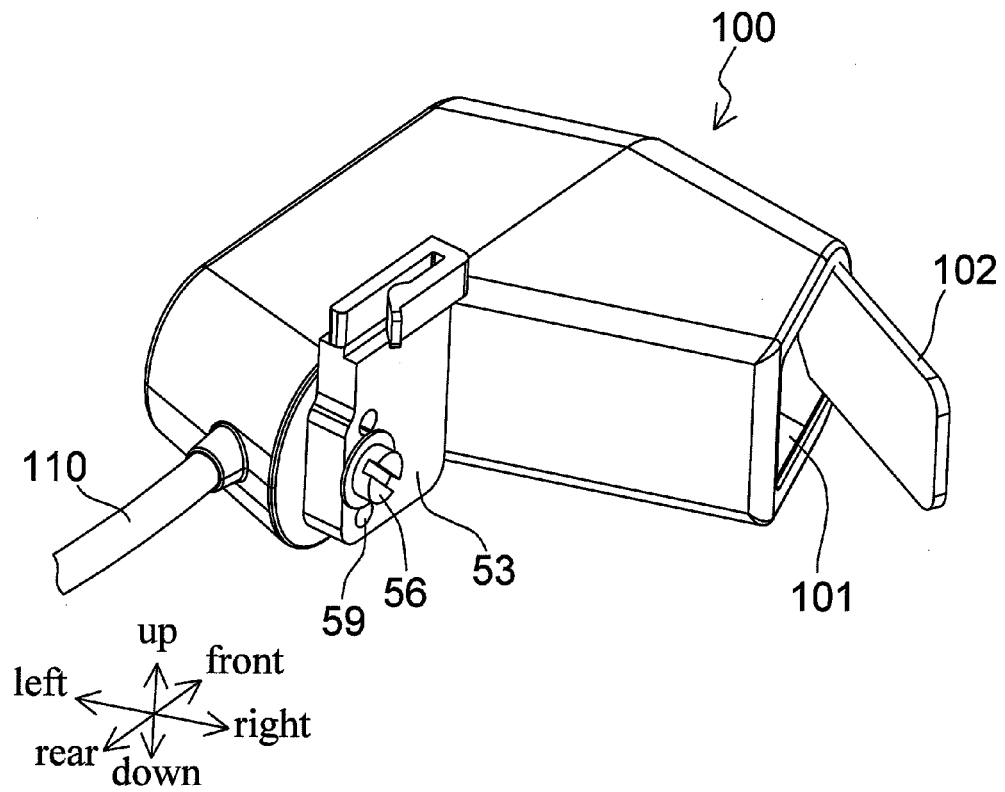
FIG. 8 is an enlarged perspective view of the image display unit 100, according to an embodiment of the invention.

A retaining mechanism 50 may retain the image display unit 100 one of the connection portion 30A and 30B, which may allow the user to choose a preferred retaining state of the image display unit 100, e.g., either in the connection portion 30A or 30B. Referring to FIGS. 3 and 8, retaining mechanism 50 may comprise pair of left side and right side extending portions 51A and 51B, a pair of left side and right side pressing portions 52A and 52B, and a left mounting member 53. In an embodiment of the invention, the retaining mechanism 50 may retain the image display unit 100 in the connection portion 30A.

Figure 9:
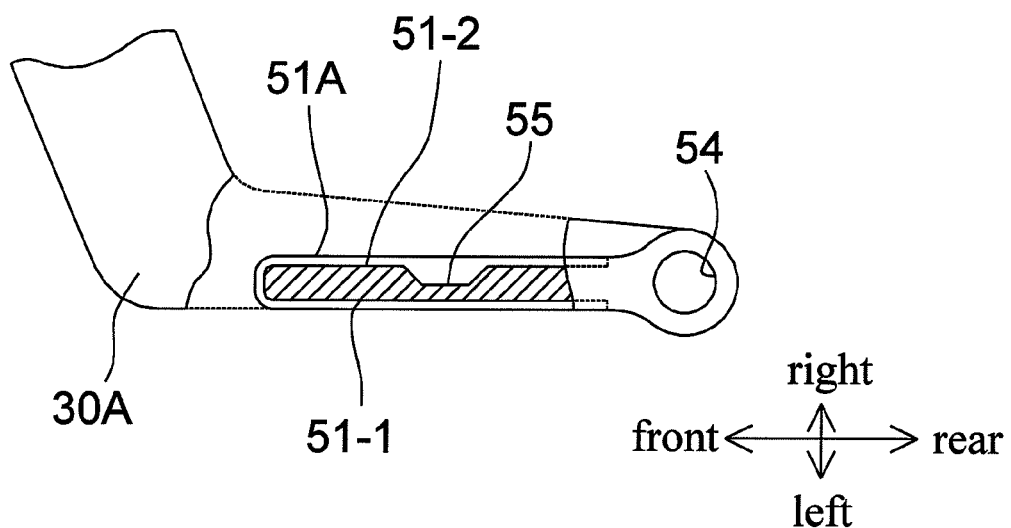
FIG. 9 is an enlarged plan view of the connection portion 30A, shown without a temple portion 40A, and with the connection portion 30A partially severed, according to an embodiment of the invention.
Figure 10:
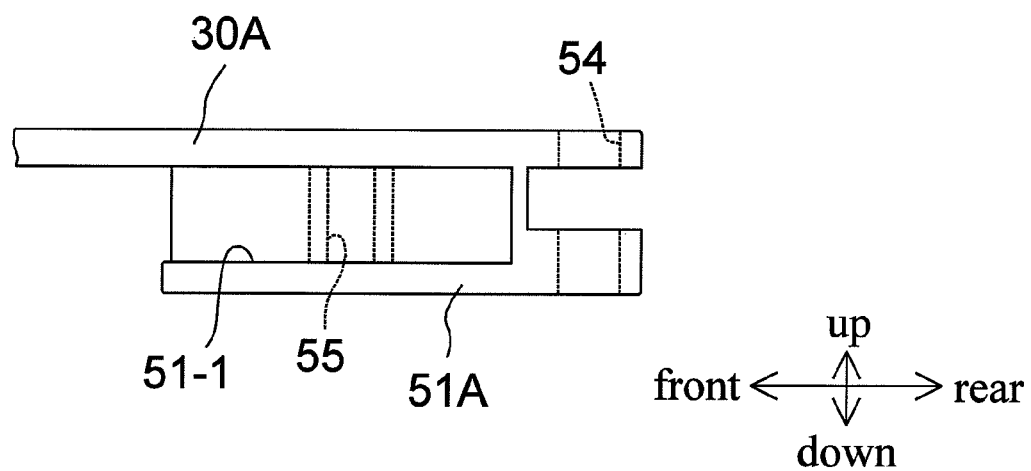
FIG. 10 is an enclosed left side view of the connection portion 30A and an extending portion 51A, shown without the temple portion 40A, according to an embodiment of the invention.

Extending portion 51A and extending portion 51B may be substantially symmetric in their structure. Thus, extending portion 51A is described herein in detail, and a detailed description of extending portion 51B may be omitted. Referring to FIG. 3, the extending portion 51A, which may be fixed to a bottom surface of the connection portion 30A, may extend in the forward direction from a position at which the retaining screw 41A may be retained. Referring to FIGS. 9 and 10, a first guide groove 51-1 and a second guide groove 51-2 may be formed on a left side and a right side surfaces of the extending portion 51A, respectively. First guide grooves 51-1 and second guide grooves 51-2 may extend in the forward direction from a retaining hole 54 in which the retaining screw 41A is inserted, opening on a front edge portion of the extending portion 51A. An engaging hollow 55 may be formed on a central portion of the second guide groove 51-2.

Figure 11:
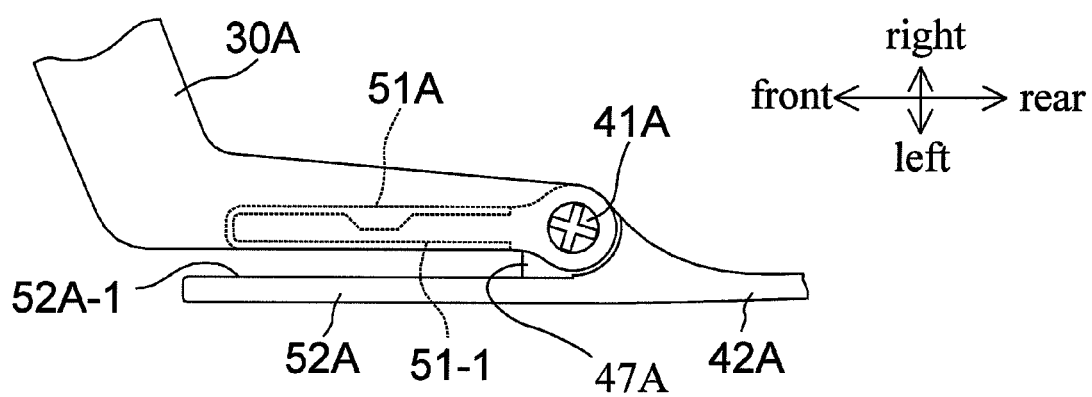
FIG. 11 is an enlarged plan view that shows a relative position between the connection portion 30A and a pressing portion 52A, according to an embodiment of the invention.
Figure 12:
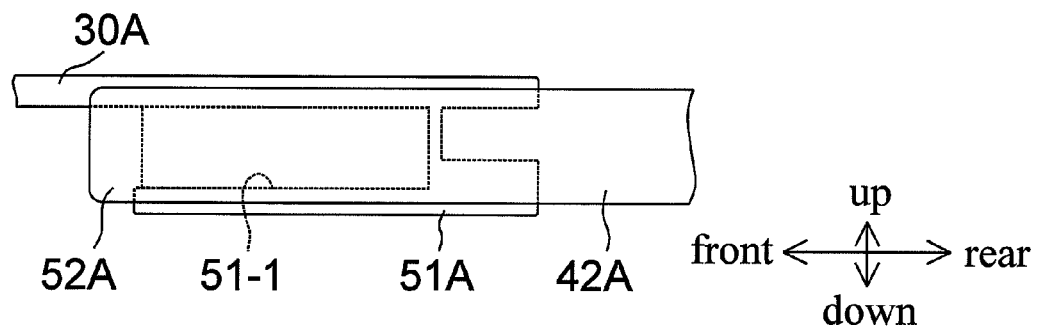
FIG. 12 is an enlarged left side view that shows a relative position between the connection portion 30A and the pressing portion 52A, according to an embodiment of the invention.

Pressing portion 52A and pressing portion 52B may be substantially symmetric in their structure. Thus, pressing portion 52A is described herein in detail, and a detailed description of pressing portion 52B is omitted. The pressing portion 52A, which may be integrally formed with the temple body 42A, may extend in a forward direction from the connection portion 47A. Referring to FIGS. 11 and 12, the pressing portion 52A may comprise a pressing surface 52A-1. The pressing portion 52A may be positioned to face the extending portion 51A, for holding a portion of the left mounting member 53 between the extending portion 51A and the pressing surface 52A-1. The pressing portion 52A may be longer than the extending portion 51A in the forward direction. In an embodiment of the invention, a size of the pressing portion 52A in the up-and-down direction is the same as that of the temple body 42A, and is larger than that of the first guide groove 51-1.

The pressing portion 52A may be more elastic than the extending portion 51A for at least the following two reasons. First, the extending portion 51A and the connection portion 30A may comprise substantially pure titanium, and the pressing portion 52A and the temple body 42A may comprise beta titanium. Second, when a cross-sectional shape of the pressing portion 52A is viewed in a direction perpendicular to a longitudinal direction of pressing portion 52A, a length in the right-and-left direction, i.e., a width, is smaller than a length in the up-and-down direction, i.e., a height. Similarly, when a cross-sectional shape of the temple body 42A is viewed in a direction perpendicular to a longitudinal direction of temple body 42A, a length in the right-and-left direction, i.e., a width, is smaller than a length in the up-and-down direction, i.e., a height.

When the frame 10 is mounted on the user, a bending moment may be applied around the rotation axes of the mounting screws 41A and 41B and on the pressing portion 52A. Because of the underlying constituent material and the cross-sectional shape, the deformation of the pressing portion 52A caused by the bending moment may be larger in magnitude than the deformation of the extending portion 51A.

Figure 13A:
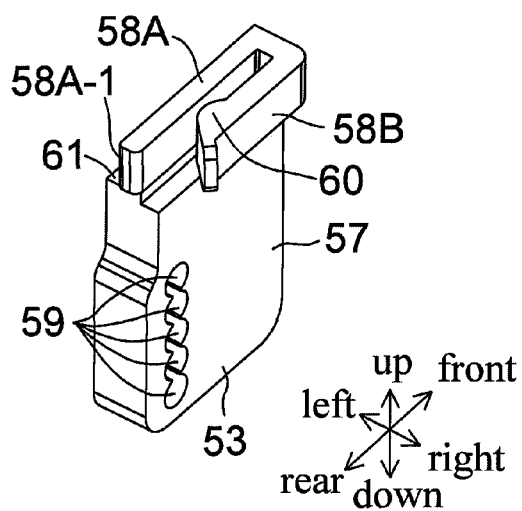
FIG. 13A is an enlarged perspective rear view of a left mounting member 53, according to an embodiment of the invention.
Figure 13B:
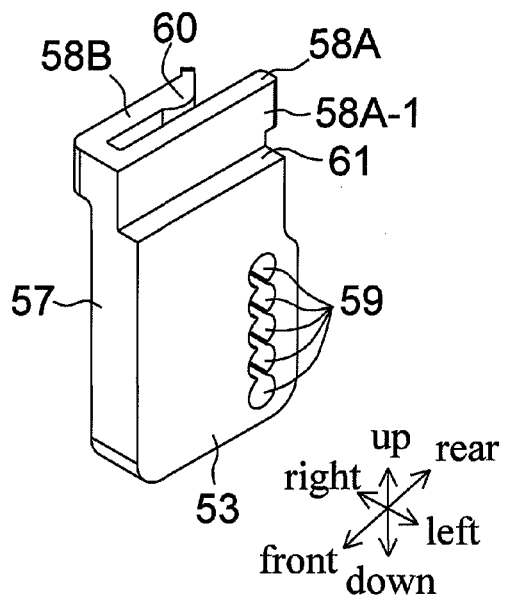
FIG. 13B is an enlarged perspective front view of the left mounting member 53, according to an embodiment of the invention

As shown in FIG. 8, the left mounting member 53 may be mounted on a right side of a rear portion of the image display unit 100 with a mounting screw 56. As shown in FIGS. 13A and 13B, the left mounting member 53 may comprise a mounting body 57, and a pair of holding portions 58A and 58B. The pair of holding portions 58A and 58B may be positioned at an upper area of the mounting body 57, and may be integrally formed with the mounting body 57. Holding portions 58A and 58B may comprise a synthetic resin. A plurality of, e.g., five, fitting holes 59, may be formed on a rear portion of the mounting body 57. Each of fitting holes 59 may be positioned at different positions in the up-and-down direction. The plurality of fitting holes 59 may allow the user to mount the left mounting member 53 on the image display unit 100 at the user's preferred height, by inserting the shaft of a retaining screw 56 into any one of the plurality of fitting holes 59, and by screwing the retaining screw 56 into a threaded screw hole positioned in the image display unit 100.

The pair of holding portions 58A and 58B may hold the extending portion 51A by contacting both side surfaces of the extending portion 51A. The first holding portion 58A may be fixed to an upper area of the mounting body 57. The second holding portion 58B may be elastically deformable, such that second holding portion 58B may approach and be separated from the first holding portion 58A. The second holding portion 58B may comprise an engaging bump 60. Engaging bump 60 may protrude from a proximal portion of a free end of the second holding portion 58B to the first holding portion 58A. The free end of the second holding portion 58B may be curved such that the free end of the second holding portion 58B may be separated from, e.g., apart from, the first holding portion 58A. When the image display unit 100 is mounted on the connection portion 30A, the first holding portion 58A and the second holding portion 58B may fit the opened front edge portion of the extending portion 51A and may be guided by the first guide groove 51-1 and the second guide groove 51-2. Then, the engaging bump 60 may engage with the engaging hollow 55.

As shown in FIG. 13B, a step portion 61 may be formed on a connecting portion between the first holding portion 58A and the mounting body 57. Referring back to FIG. 2, when the image display unit 100 is mounted on the connection portion 30A, the step portion 61 may form a space into which the pressing portion 52A may enter. The space may be positioned to allow the pressing portion 52A to press a left side surface 58A-1 that faces the pressing surface 52A-1. As shown in FIG. 11, the size of the pressing surface 52A-1 may be longer than that of the left side surface 58A-1 in the front-and-rear direction, and may be the same as that of the left side surface 58A-1 in the up-and-down direction. That is, the pressing surface 52A-1 may be larger in area than the left side surface 58A-1 that faces the pressing surface 52A-1.

Figure 14:
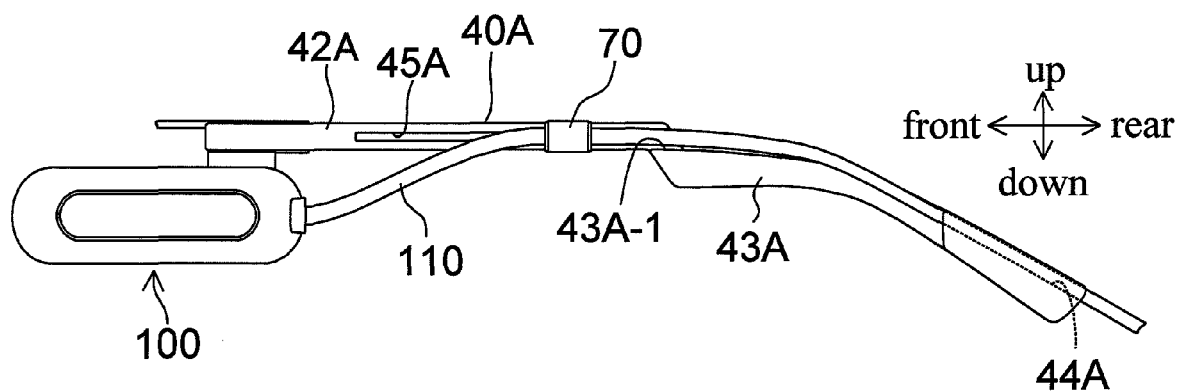
FIG. 14 is a left side view of the temple portion 40A with the image display unit 100, according to an embodiment of the invention.
Figure 15:
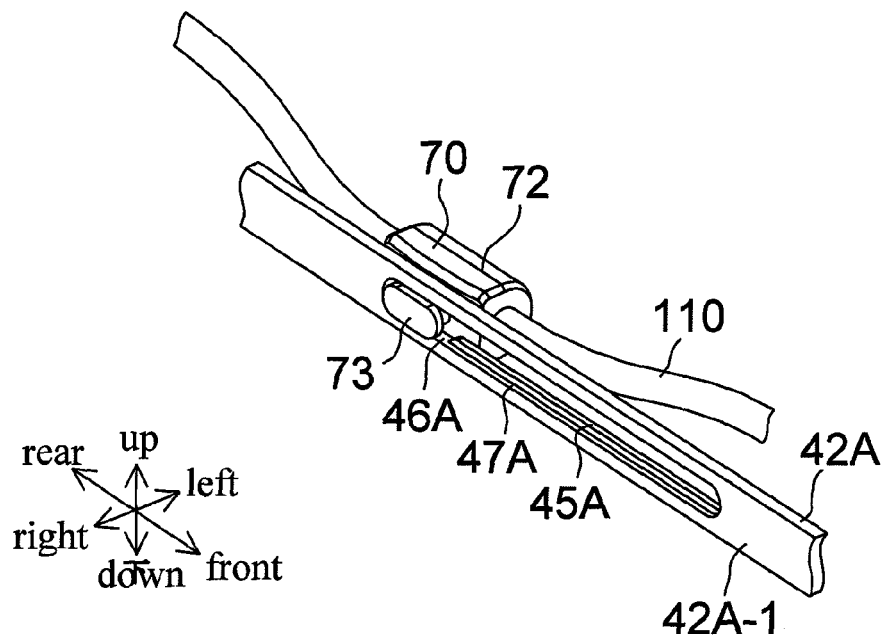
FIG. 15 is an enlarged right perspective view of the temple body 42A and a retaining member 70, according to an embodiment of the invention.
Figure 16A:
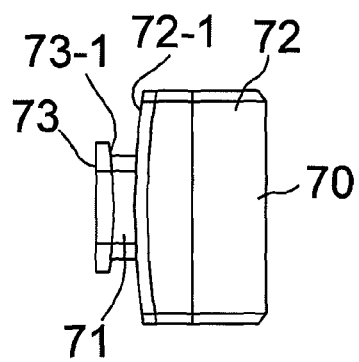
FIG. 16A is an enlarged plan view of the retaining member 70, according to an embodiment of the invention.
Figure 16A:
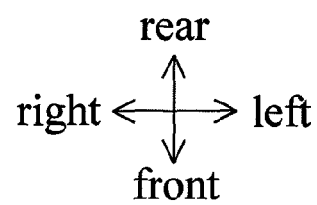
Figure 16B:
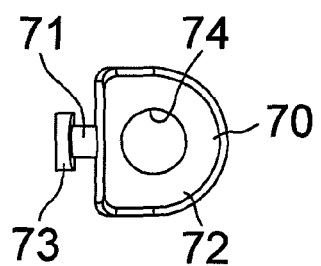
FIG. 16B is an enlarged front view of the retaining member 70, according to an embodiment of the invention.
Figure 16B:
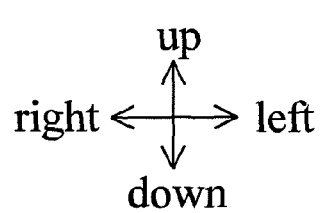

Referring again to FIG. 2, the cable 110 may be retained along the temple portion 40A. FIGS. 14-16B describe a structure to retain the cable 110 according to an embodiment of the invention. As shown in FIGS. 14 and 15, a retaining member 70 may be slidably attached to the elongated hole 45A. Moreover, as shown in FIGS. 16A and 16B, the retaining member 70 may comprise a sliding portion 71 that may be engageable with the elongated hole 45A, a cable retaining portion 72, and a platelike portion 73. Each of sliding portion 71, cable retaining portion 72, and platelike portion 73 may be integrally made from a synthetic resin.

As shown in FIG. 16B, the cable retaining portion 72, formed with the sliding portion 71 on a left side of the sliding portion 71, may include a through-hole 74 formed therein, into which the cable 100 may be inserted in the front-and-rear direction. As shown in FIG. 15, the size of the platelike portion 73 may be larger than the size of the elongated hole 45A in the up-and-down direction, and the size of the platelike portion 73 may be smaller than the size of the aperture opening 46A in the up-and-down direction, such that the platelike portion 73 may pass through the aperture opening 46A in the right-and-left direction. A sliding guide groove 47A, which may extend forwardly from the aperture opening 46A, may be formed along the elongated hole 45A in a right side surface 42A-1 of the temple body 42A. The size of the sliding guide groove 47A may be the same as that of the aperture opening 46A in the up-and-down direction. The platelike portion 73 may be slidable along the sliding guide groove 47A, by engaging with the sliding guide groove 47A after passing through the aperture opening 46A.

Figure 17:
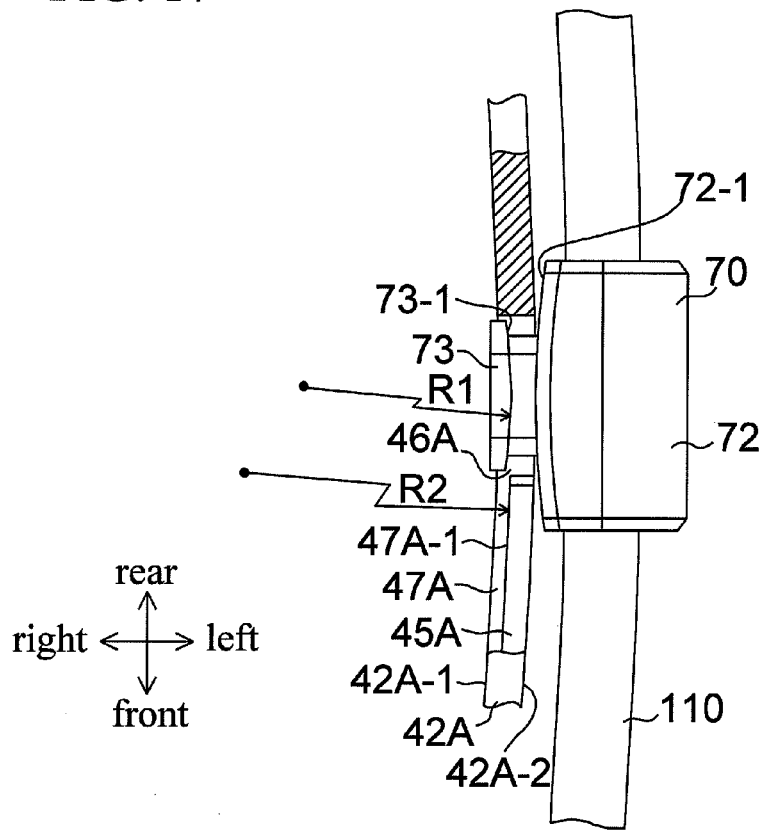
FIG. 17 is an enlarged plan view of the retaining member 70 engaged with the temple body 42A, according to an embodiment of the invention.

As shown in FIGS. 16A and 17, the cable retaining portion 72 and the platelike portion 73 may comprise a sliding surface 72-1 and a sliding surface 73-1, respectively. The sliding surface 72-1 may selectively contact with a left side surface 42A-2 of the temple body 42A and the sliding surface 73-1 may selectively contact with the sliding guide groove 47A. The sliding surface 72-1 may be curved along the front-and-rear direction such that sliding surface 72-1 may have a convex shape toward the left side surface 42A-2 of the temple body 42A. Similarly, the sliding surface 73-1 may be curved along the front-and-rear direction such that sliding surface 73-1 may have a convex shape toward a sliding surface 47A-1 in the sliding guide groove 47A. As shown in FIG. 4, the left side temple body 42A may be slightly curved, such that left side temple body 42A may form a convex shape toward the left direction. Similarly, the right side temple body 42B may be slightly curved, such that the right side temple body 42B may form a convex shape toward the right direction. As shown in FIG. 17, the temple body 42A may be curved when the frame 10 is in an unmounted state, e.g., a state in which frame 10 is not mounted on the user.

A curvature radius R1 of the sliding surface 73-1 in the platelike portion 73 may be smaller than a curvature radius of the right side surface 42A-1 of the temple body 42A under the unmounted state. Specifically, the curvature radius R1 may be smaller than a curvature radius R2 of the sliding surface 47A-1. When the frame 10 is mounted on the user, the temple body 42A bends, such that the curvature radius of the temple body 42A may be enlarged. Thus, the curvature radius R1 may be smaller than the curvature radius R2 whether the frame 10 is mounted on the user or not. Because of this relationship between the curvature radius R1 and the curvature radius R2, the sliding surface 73-1 may contact the sliding surface 47A-1 at one point, and the sliding surface 72-1 also may contact with the left side surface 42A-2 at one point. Thus, this configuration may allow the retaining member 70 to slide smoothly regardless of the bend of temple body 42.

Figure 18:
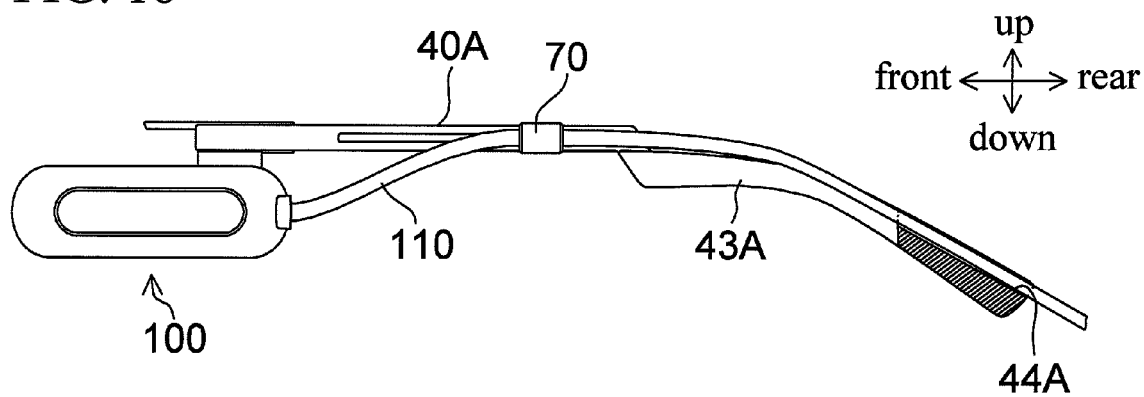
FIG. 18 shows a view similar to FIG. 14, except that the temple portion 40A is partially shown in a cross-sectional manner, to expose a cable retaining groove 44A.

As shown in FIGS. 2 and 14, the cable 110, which may extend in the rearward direction from the image display unit 100, may be retained in the left side of the temple body 42A with the cable retaining member 70. Specifically, as shown in FIG. 14, the cable 110 may exit into an area above the upper surface 43A-1 of the ear mounting portion 43A from the cable retaining member 70. As shown in FIG. 18, the cable retaining groove 44A may be formed deeply enough to house the cable 110 inside the cable retaining groove 44A.

In an embodiment of the invention, the image display unit 100 may be configured to contain few optical systems, in order to reduce the weight of the image display unit 100. In order to reduce the weight, other optical systems may be contained in an external apparatus 200. In an embodiment of the invention, the external apparatus 200 may comprise a red-green-blue ("RGB") image signal supply circuit, one or more RGB laser sources, a laser source driver, and a laser coupling optical system for the RGB laser beams. The cable 110 may comprise an optical fiber that transmits a coupled RGB laser beam. The image display unit 100 also may comprise internal optical systems, e.g., a collimate lens, a horizontal scan portion, a vertical scan portion, an eye lens, and other portions of internal optical systems. As shown in FIG. 8, the image display unit 100 may comprise a light emitting aperture 101. A translucent half mirror 102 may be attached to a proximal portion of the light emitting aperture 101. An angle between the half mirror 102 and the light emitting aperture 101 may be adjusted by tweaking, e.g., slightly moving, the half mirror 102. The image display unit 100 may emit the coupled RGB laser beam from the cable 110 to the half mirror 102 via the internal optical systems. The coupled RGB laser beam may be reflected by the half mirror 102 and may enter the user's eye.

FIGS. 19-22 illustrate an operation of the HMD according to an embodiment of the invention. Different users may prefer a different side, e.g., a right side or a left side, as a side for mounting the image display unit 100. Thus, the user first may choose one of the connection portions 30A and 30B at which to mount the image display unit 100. A shape of a mounting member for mounting the image display unit 100 may be different according to whether the image display unit 100 is mounted on the connection portion 30A or the connection portion 30B. As shown in FIG. 13, the left mounting member 53 may have a shape for mounting the image display unit 100 on the connection portion 30A.

Figure 23A:
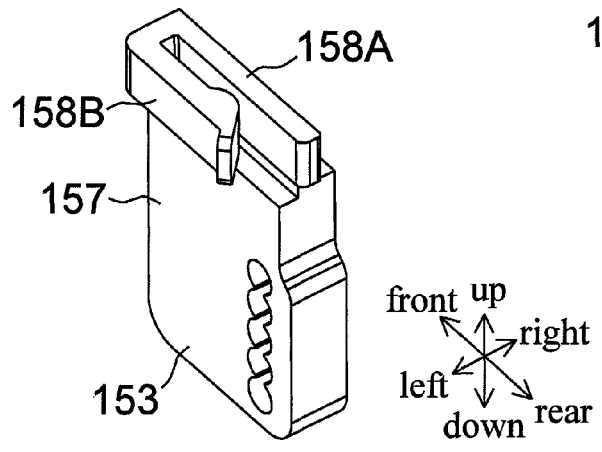
FIG. 23A is an enlarged perspective rear view of a right mounting member 153, according to an embodiment of the invention.
Figure 23B:
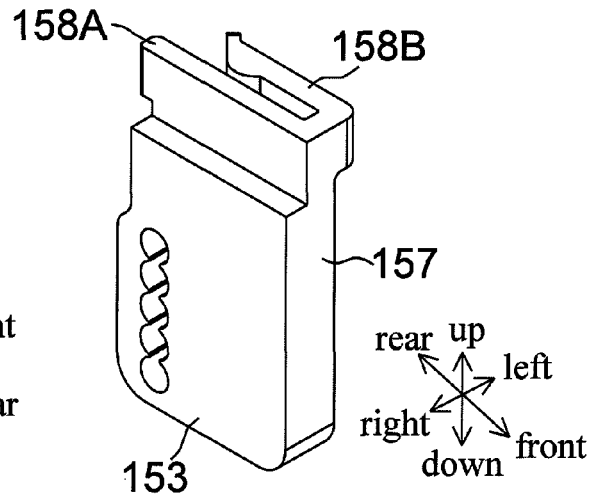
FIG. 23B is an enlarged perspective front view of a right mounting member 153, according to an embodiment of the invention.

As shown in FIGS. 23A and 23B, a right mounting member 153 may be used in a case in which the image display unit 100 is mounted on the connection portion 30B. The right mounting member 153 may have a different shape than the left mounting member 53. A second holding portion 158B may be positioned on the left side of a first holding portion 158A. Other components of the right mounting member 153 are the same as those of the left mounting member 53, and their detailed description is omitted. In an embodiment of the invention, the image display unit 100 may be mounted on the connection portion 30B in an upside-down orientation from the position shown in FIG. 8. In this embodiment, images transmitted via the cable 110 also may be displayed in an upside-down position.

In an embodiment of the invention, image display unit 100 may be mounted on the connection portion 30A as described herein. First, the user may determine a position of the image display unit 100 relative to the frame 10 in the up-and-down direction. If the user tends to frequently look at a large display or document in front of the user, and seldom looks at images from the image display unit 100, the image display unit 100 may be mounted on a lower position relative to the possible mounting positions, such that the user's front view may be clear. On the other hand, if the user tends to frequently look at images from the image display unit 100 with rarely moving the user's view, the image display unit 100 is mounted on a position close to the frame 10 because clearing the user's front view is not required. According to the usage of the image display unit 100, the user mounts the left mounting member 53 on the image display unit 100 by inserting the retaining screw 56 into one of the plurality of fitting holes 59 in the left mounting member 53.

Figure 19:
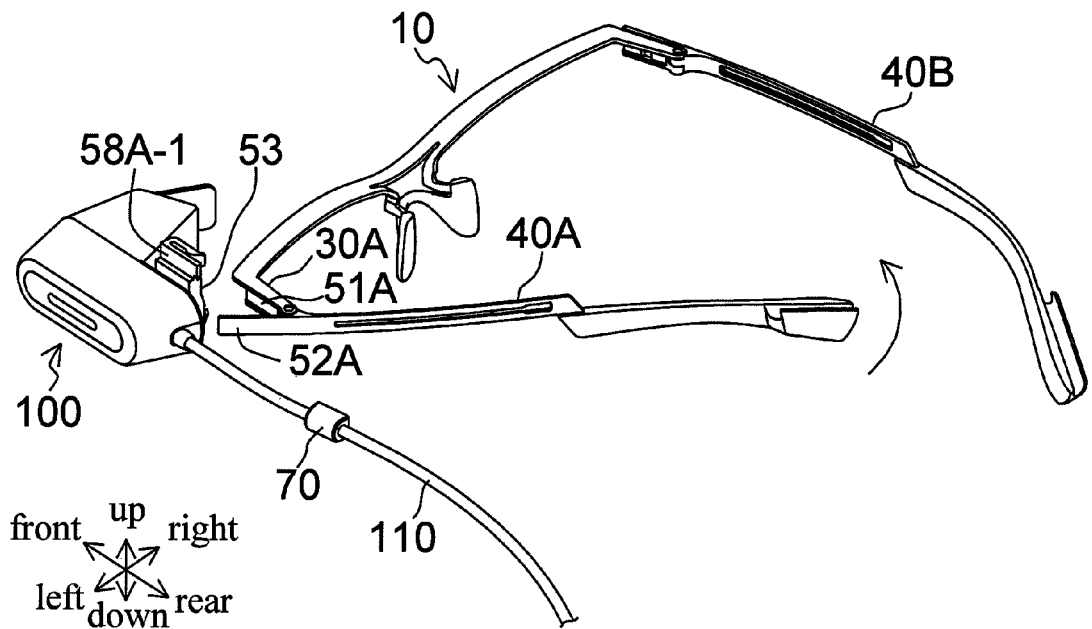
FIG. 19 is to show a state in which the image display unit 100 is about to be mounted, after the pressing portion 52A is separated from the extending portion 51A as a result of a counterclockwise rotation of the temple portion 40A, according to an embodiment of the invention.
Figure 20:
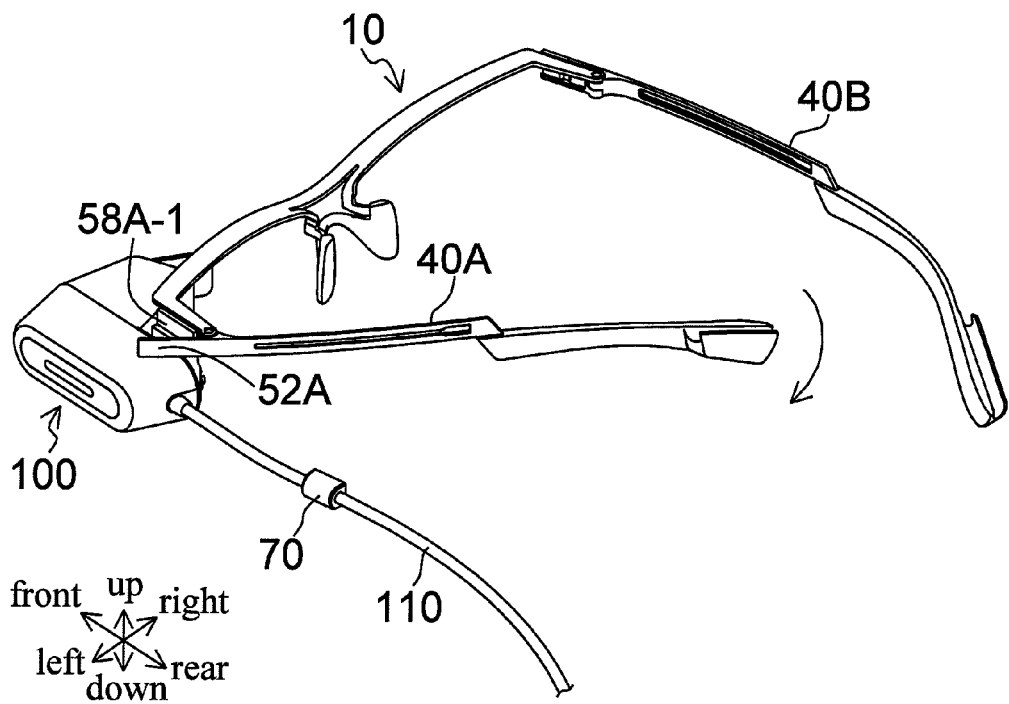
FIG. 20 is to show a state soon after the image display unit 100 is mounted on the connection portion 30A, according to an embodiment of the invention.

When frame 10 is not mounted on the user, then, as shown in FIG. 19, the user may separate the pressing portion 52A from the extending portion 51A by rotating the temple portion 40A counterclockwise. The user then may fit both holding portions 58A and 58B to both guide grooves 51-1 and 51-2, respectively, from the opened front edge portion of the extending portion 51A. This fitting operation allows the engaging bump 60 in the second holding portion 58B to engage with the engaging hollow 55 in the extending portion 51A. By fitting both holding portions 58A and 58B in the guide grooves 51-1 and 51-2, respectively, a position of the image display unit 100, relative to the frame 10, in the up-and-down direction, may be determined. The image display unit 100 may be retained in the connection portion 30A without dropping from the frame 10. Similarly, by engaging the engaging bump 60 with the engaging hollow 55, a position of the image display unit 100, relative to the frame 10, in the front-and-rear direction, may be determined. As shown in FIG. 20, the image display unit 100 may be retained in the connection portion 30A without forwardly dropping from the guide grooves 51-1 and 51-2.

Figure 21:
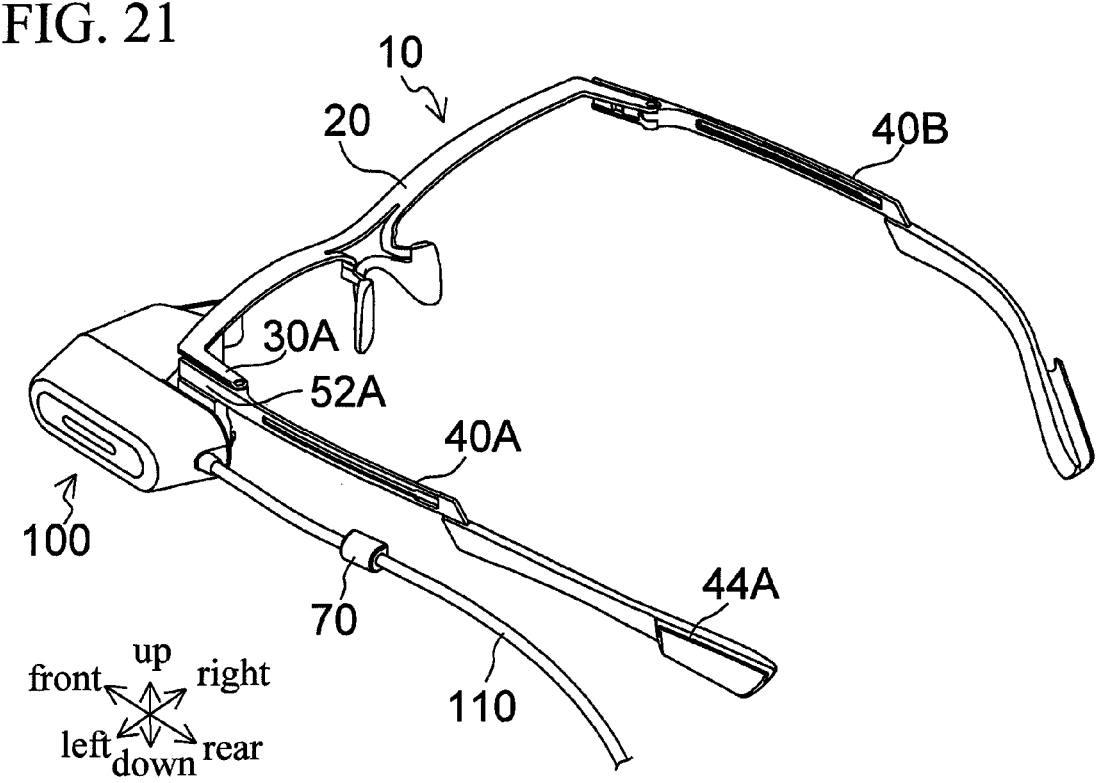
FIG. 21 is to show a state in which the temple portion 40A rotates clockwise and the pressing portion 52A presses the first holding portion of the left mounting member 53, according to an embodiment of the invention.

In order to keep the state of retaining of the image display unit 100, as shown in FIG. 20, the user presses the pressing portion 52A into the left side surface 58A-1 of the first holding portion 58A by rotating the temple portion 40A clockwise. As shown in FIG. 21, the first holding portion 58A is positioned between the extending portion 51A and the pressing portion 52A. The image display unit 100 may be retained in the connection portion 30A by an operation that is not complicated to carry out, e.g., rotating the temple portion 40A. A relatively more complicated operation, e.g., screwing a retaining screw, may not be needed. The connection portion 30A, to which the extending portion 51A is fixed, is more rigid than the pressing portion 52A against a bending moment caused by the rotation of the temple portion 40A. Thus, changes in a position at which the image display unit 100 is positioned, relative to the front portion 20 and the connection portion 30, may be suppressed.

Moreover, the pressing portion 52A may be elastic, and thus the pressing portion 52A may apply enough elastic force on the left side surface 58A-1 in the first holding portion 58A to retain the image display unit 100. Furthermore, the pressing portion 52A may prevent the image display unit 100 from dropping from the extending portion 51A in a forward direction, by applying a pressing force to the entire area of both the extending portion 51A and the first holding portion 58A. This force may be generated because the pressing surface 52A-1 in the pressing portion 52A may be larger in a pressing area in the up-and-down direction and the right-and-left direction than the first guide groove 51-1, and may be larger in the pressing area than the left side surface 58A-1 in the first holding portion 58A.

As shown in FIG. 21, the cable 110 may be inserted in the through-hole 74 formed in the retaining member 70. The user may insert the platelike portion 73 in the aperture opening 46A from the left side of the aperture opening 46A, e.g., as shown in FIG. 15, which shows the state soon after the platelike portion is inserted in the aperture opening 46A. The retaining member 70 is retained in the temple body 42A by forwardly sliding the retaining member 70 along the elongated hole 45A, from the state shown in FIG. 15.

Figure 22:
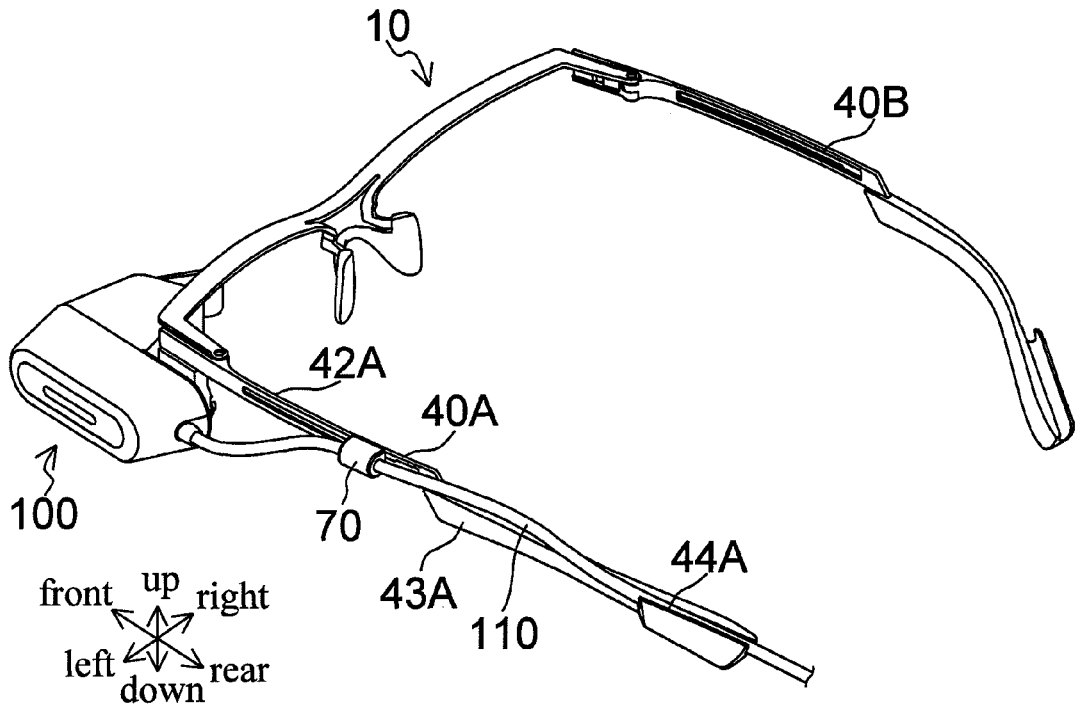
FIG. 22 is to show a state in which the retaining member 70 is mounted on the temple body 42A, and a cable 110 is retained in the cable retaining groove 44A, according to an embodiment of the invention.

The cable 110 may extend in the rearward direction from the retaining member 70, and may be engaged with the cable retaining groove 44A by the user, in order that cable 110 may not impede the mounting of frame 10 by the user. The cable retaining groove 44A may be deep enough to house the cable 110 inside the cable retaining groove 44A, and may be slightly elastically deformed by inserting the cable 110 in the cable retaining groove 44A. As shown in FIG. 22, the cable 110 may retained in the cable retaining groove 44A.

As shown in FIG. 22, the user may mount the frame 10 on the user's head with the cable 110 retained in the cable retaining groove 44A. As shown in FIG. 1, the user specifically may mount the nose mounting portion 23 on the user's nose, and may mount the ear mounting portions 43A and 43B on the user's ear. The distance between the temple portions 40A and 40B may vary according to the size of the user's head. The distance may be larger than the distance under the natural unmounted state, shown in FIG. 4. This widened distance between the temple portions 40A and 40B may cause bending moments around the rotation axes of the retaining screws 41A and 41B. A clockwise bending moment around the rotation axis of the retaining screw 41A may be placed on the temple body 42A and the pressing portion 52A. The clockwise bending moment may elastically deform the pressing portion 52A, and the pressing portion 52A may press the first holding portion 58A to the extending portion 51A. This elastic deformation of the pressing portion 52A, when the frame 10 is mounted on the user, may further apply force to retain the image display unit 100 in the connection portion 30A by further elastic force for retaining the image display unit 100.

As shown in FIG. 1, the widened distance between the temple portions 40A and 40B may cause a sag of the cable 110 between the image display unit 100 and the retaining member 70. Nevertheless The user may eliminate the sag by forwardly sliding the retaining member 70 with the frame 10 mounted on the user.

As shown in FIG. 14, the cable 110 may extend in the rearward direction. Behind the retaining member 70, the cable 110 may be disposed in the area above the upper surface 43A-1. This position of the cable 110 may prevent user discomfort by preventing cable 110 from contacting the user's ear. The cable retaining groove 44A may be formed on the most rearward portion of the ear mounting portion 43A, thereby positioning the cable retaining groove 44A behind the user's ear when the frame 10 is mounted on the user as shown in FIG. 1. A portion, in which the cable retaining groove 44A may be formed, may not press the user's ear, but instead may be reduced to contact the cable 110, sagging downward, with the user's ear and occipital.

The user may change the direction in which the coupled RGB laser beam emits, in order to view images from the image display unit 100, by adjusting the half mirror 102 with the frame 10 mounted on the user. Moreover, an angular position of the image display unit 100 relative to the left mounting member 53 may be adjustable around a rotation axis along the retaining screw 56. The user may adjust the half mirror 102 in the up-and-down direction with the frame 10 mounted on the user.

The retaining mechanism 50 may be configured to retain the image display unit 100 in the connection portion 30A, thereby preventing the image display unit 100 from interrupting the user's front view, and positioning the image display unit 100 in an area at which the user may readily see, without a large moving of the direction of eyes.

The connection portions 30A and 30B may be disposed in proximal portions of the rotation axes of the temple portions 40A and 40B, and the deformations of the connection portions 30A and 30B may be smaller than those of the temple portions 40A and 40B when bending moments are put on the temple portions 40A and 40B. Thus, the effect of the deformation that moves the image display unit 100, retained in the connection portion 30A, relative to the user's eye, may be reduced.

The pressing portion 52A may be positioned in the temple body 42A. When the frame 10 is mounted on the user, the pressing portion 52A may press the first holding portion 58A into the extending portion 51A. The image display unit 100 may be retained in the connection portion 30A by a relatively simple operation, e.g., rotating the temple portion 40A. There is no need for a relatively more complicated operation, e.g., screwing a retaining screw.

The pair of the holding portions 58A and 58B may be fitted to the two side surfaces of the extending portion 51A, thereby retaining the image display unit 100 in the connection portion 30A prior to the frame 10 being mounted on the user. Thus, the user may mount the image display unit 100 on the frame 10. When the user mounts the ear mounting portions 43A and 43B on the user's ears, the pressing portion 52A presses the first holding portion 58A into the first guide groove 51-1 in the guiding portion 51A. The pair of the holding portions 58A and 58B then hold the two side surfaces of the extending portion 51A.

When the holding portions 58A and 58B fit the guide grooves 51-1 and 51-2, the engaging bump 60 engages with the engaging hollow 55. By engaging the engaging bump 60 with the engaging hollow 55, together with fitting the holding portions 58A and 58B to the guide grooves 51-1 and 51-2, the image display unit 100 may be rigidly kept in the connection portion 30A before the frame 10 is mounted on the user. This allows the user to mount the image display unit 100 on the frame 10.

The pair of the holding portions 58A and 58B may fit the opened front edge portion of the extending portion 51A, and may be guided by the guide grooves 51-1 and 51-2. The user may fit the pair of the holding portions 58A and 58B to the guide grooves 51-1 and 51-2, which may limit the up-and-down position of holding portions 58A and 58B, which may accurately position holding portions 58A and 58B opposing the pressing portion 52A.

The left mounting member 53 may be detachably mounted on the image display unit 100 with the retaining screw 56. The user may detach the left mounting member 53 and attach the right mounting member 153 for changing the position of the image display unit 100 in the right-and-left direction. The mounting body 57 may have the plurality of fitting holes 59 formed therethrough in different positions in the up-and-down direction. The position of the image display unit 100 in the up-and-down direction may be determined by one of the plurality of fitting holes 59 into which the retaining screw 56 is inserted. The user may adjust the position of the image display unit 100 in the up-and-down direction The pressing surface 52A-1 in the pressing portion 52A is larger in a pressing area in the up-and-down direction and the right-and-left direction than the first guide groove 51-1, and is larger in area than the left side surface 58A-1 in the first holding portion 58A. The pressing portion 52A may press the entire left side surface 58A-1, preventing the image display unit 100 from forwardly dropping from the extending portion 51A.

Both the front portion 20 and the connection portions 30A and 30B may be more rigid than the temple bodies 42A and 42B. More precisely, the cross-sectional shapes of both the front portion 20 and the connection portions 30A and 30B may be larger in ratio of width to height than those of the temple bodies 42A and 42B. When the frame 10 is mounted on the user, the effect of the deformation of the temple bodies 42A and 42B on the position of the front portion 20 and the connection portions 30A and 30B may be limited. The image display unit 100, retained in one of the connection portions 30A and 30B, may be kept in a fixed position relative to the user's eye.

The retaining member 70 may be slidably attached to the elongated hole 45A in the front-and-rear direction, such that the cable 110 may not prevent the user from mounting the ear mounting portions 43A and 43B on the user's ears. When the image display unit 100 is mounted on the connection portion 30A, the user may slide the retaining member 70 to sag the cable 110 for easily mounting the image display unit 100.

The retaining member 70 may be removably mounted on the temple body 42A by inserting and removing the platelike portion 73 through the aperture opening 46A. When the image display unit 100 is removed from the connection portion 30A, the user may handle the image display unit 100 and the frame 10 individually by removing the retaining member 70 from the temple body 42A through the aperture opening 46A.

The sliding surface 73-1 in the platelike portion 73 may be curved along the front-and-rear direction in a convex shape toward the sliding surface 47A-1 in the sliding guide groove 47A. The curvature radius R1 of the sliding surface 73-1 may be smaller than the curvature radius R2 of the sliding surface 47A-1. Thus, the sliding surface 73-1 may contact with the sliding surface 47A-1 at one point, which may allow the retaining member 70 to slide smoothly.

The cable retaining groove 44A may be formed on the left side surface of the ear mounting portion 43A at a rear edge portion of the ear mounting portion 43A. When the frame 10 is mounted on the user, the cable 110 may be retained in the cable retaining groove 44A. The cable 110 may not prevent the user from mounting the frame 10.

The ear mounting portion 43A is connected with the temple body 42A in an area lower than the elongated hole 45A. The cable 110 does not interfere with the upper surface 43A-1 of the ear mounting portion 43A. The user easily mounts the frame 10 on oneself without bothering about the handling of the cable 110.

When the pair of holding portions 58A and 58B hold the both side surfaces of the extending portion 51A, the image display unit 100 may be positioned at a position lower than the front portion 20 and the connection portion 30A. Thus, the image display unit 100 may not interrupt the user's front view, and the user may view images from the image display unit 100 by downwardly moving the user's view.

Figure 24:
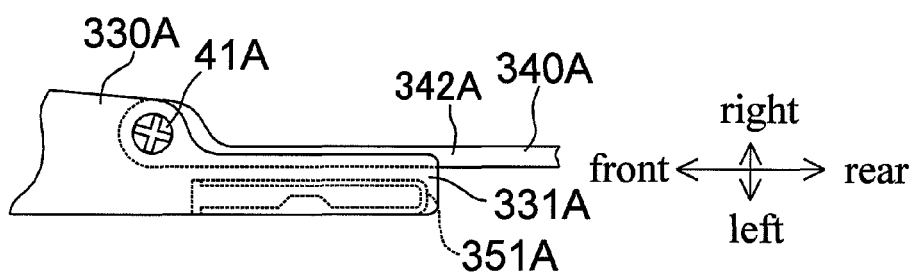
FIG. 24 is an enlarged plan view of a connection portion 330A and a temple portion 340A, according to another embodiment of the invention.
Figure 25:
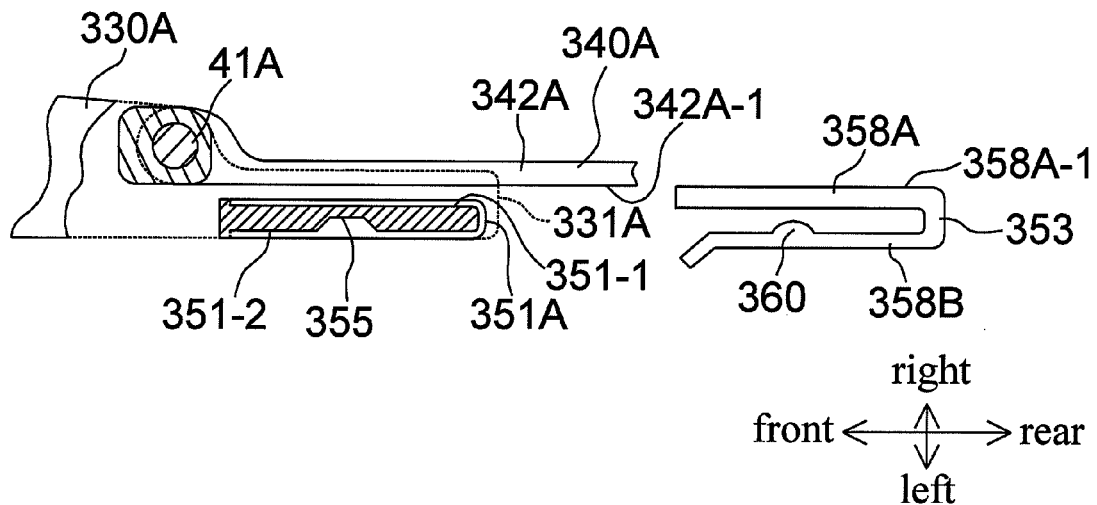
FIG. 25 is a plan view showing a pair of holding portions 358A and 358B and an extending portion 351A with the partially severed connection portion 330A, according to an embodiment of the invention.
Figure 26:
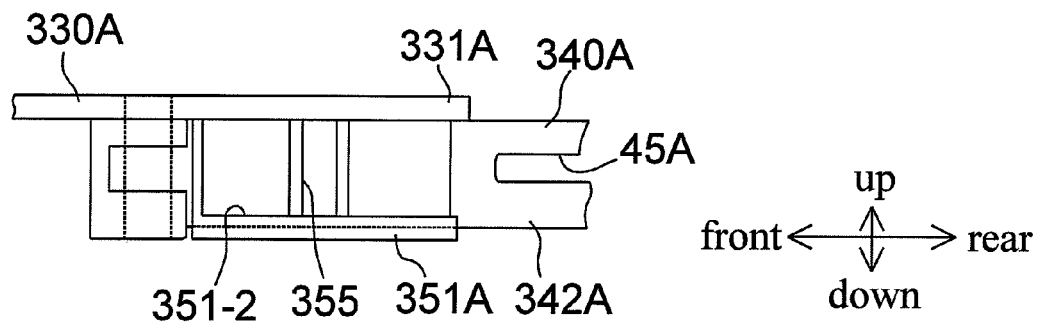
FIG. 26 is a left side view of the connection portion 330A, the extending portion 351A, and the temple portion 340A, according to an embodiment of the invention.

FIGS. 24-26 show another embodiment of the invention, with, like numerals being used for corresponding portions in the various drawings. In this embodiment, the structure of a frame may be different from that in the previously-described embodiment. More precisely, a connection portion, a temple portion, an extending portion, a pressing portion, and a pair of holding portions may be different from those described in the previous embodiment. Other structure may be substantially the same as those previously described with respect to the above embodiment. In the embodiment described herein, the same numerals are assigned for the same structures as those in the previously-described embodiment.

As shown in FIG. 24, a temple body 342A in a temple portion 340A may be rotatably connected to the connection portion 330A by the mounting screw 41A. The connection portion 330A may comprise a supporting portion 331A that may extend in the rearward direction from the position in which the mounting screw 41A may be retained. In an embodiment of the invention, both the connection portion 330A and the supporting portion 331A may comprise substantially pure titanium. Similarly to the above embodiment, when cross-sectional shapes of the connection portion 330A and the supporting portion 331A are viewed, a length in the up-and-down direction, e.g., a height, may be smaller than a length in the right-and-left direction, e.g., a width. In an embodiment of the invention, the temple portion 340A and the temple body 342A may comprise beta titanium. In a cross-sectional shape of the temple body 342A in a direction perpendicular to a longer direction thereof, as well as in the first embodiment, a length in the up-and-down direction, i.e., a height, is larger than a length in the right-and-left direction, i.e., a width.

An extending portion 351A may be fixed to a lower surface of the supporting portion 331A. The extending portion 351A may extend in the rearward direction from a proximal portion of the position in which the mounting screw 41A may be retained. In an embodiment of the invention, the extending portion 351A may comprise substantially pure titanium. As shown in FIGS. 25 and 26, the extending portion 351A may have a first guide groove 351-1 formed therein, a second guide groove 351-2 formed therein, and an engaging hollow 355. The first guide groove 351-1 may be formed on a right side surface of the extending portion 351A, and the second guide groove 351-2 may be formed on a left side surface of the extending portion 351A. The first guide groove 351-1 and the second guide groove 351-2 may be formed such that each of first guide groove 351-1 and second guide groove 351-2 may open on a rear edge portion of the extending portion 351A. The engaging hollow 355 may be formed on a central portion of the second guide groove 351-2.

As shown in FIG. 25, a mounting member 353 may be retained in the image display unit 100 with the retaining screw 56. Mounting member 353 may comprise a first holding portion 358A and a second holding portion 358B. The holding portions 358A and 358B may be integrally formed with the mounting body 57. The second holding portion 358B may be elastically deformable, such that second holding portion 358B may selectively approach and be separated from the first holding portion 358A. The second holding portion 358B may comprise an engaging bump 360 protruding from a central portion of the second holding portion 358B to the first holding portion 358A.

The free end of the second holding portion 358B is curved so as to be separated from the first holding portion 358A. When the image display unit 100 is mounted on the connection portion 330A, the first holding portion 358A and the second holding portion 358B fit the opened rear edge portion of the extending portion 351A and are guided by the first guide groove 351-1 and the second guide groove 351-2. The engaging bump 360 engages with the engaging hollow 355.

As shown in FIG. 25, when the temple portion 340A is mounted on the user's ear, the temple portion 340A may rotate clockwise, and the holding portions 358A and 358B may engage guide grooves 351-1 and 351-2. The rotation of the temple portion 340A may cause a left side surface 342A-1 of the temple body 342A to press a right side surface 358A-1 of the holding portion 358A, into the extending portion 351A.

Similarly, the left side surface 342A-1 of the temple body 342A also may carry out a pressing operation similarly to the pressing operation of the pressing surface 52A-1, as described in the above embodiment, thereby retaining the image display unit 100 in the connection portion 330A.

In an embodiment of the invention, the image display unit 100 may be retained in the one of the left side and the right side of the frame 10. The two image display units 100 may be retained in the frame 10. Specifically, one image display unit 100 may be retained in the left side of the frame 10, and the other image display unit 100 may be retained in the right side of the frame 10.

In an embodiment of the invention, both holding portion 58A and holding portion 58B fit the extending portion 51A from the forward direction, and both holding portions 358A and 358B fit the extending portion 351A from the rearward direction. Additionally, both holding portions 58A and 58B may fit a extending portion from the right-and-left direction. In this embodiment, e.g., the embodiment in which both holding portions fit the extending portion from the right-and-left direction, a temple portion may rotate substantially for separating a pressing portion or a temple body from the extending portion. Nevertheless, in this embodiment, an image display unit may be retained in a connection portion, due in part to the rotation of the temple portion. In another embodiment of the invention, alternatively, both holding portions may fit an extending portion from the downward direction. In this case, an engaging bump and an engaging hollow may be formed on the direction orthogonal to the up-and-down direction, such that both holding portions may be prevented from dropping downward from the extending portion.

In an embodiment of the invention, the pressing portion 52A may press the first holding portion 58A to the extending portion 51A, and the temple body 342A may press the first holding portion 358A to the extending portion 351A. The pressing portion 52A and the temple body 342A may enlarge a retaining force to retain the image display unit 100 in the connection portions 30A and 330A. Nevertheless, a sufficient retaining force may be obtained by the second holding portions 58B and 358B, the engaging hollows 55 and 355, and the engaging bumps 60 and 360. In an embodiment of the invention, the structure for pressing the first holding portion 58A and 358A with the pressing portion 52A and the temple body 342A may optionally be omitted.

In an embodiment of the invention, the extending portions 51A and 351A may be fixed to a lower surface of the connection portions 30A and 330A. The extending portions may be fixed to an upper surface of the connection portions. In this embodiment, when holding portions of a mounting member fit the extending portion, the upper surface of the connection portions prevent the mounting member from moving downward. Thus, the position of the image display unit in the up-and-down direction may be retained.

In an embodiment of the invention, the front portion 20 and the connection portions 30A and 330A may be different from the temple bodies 42A and 342A and the pressing portion 52A, e.g., they may comprise different constituent materials and may have different cross-sectional shapes. Based on these differences, the former are more rigid than the latter. However, either or both of the constituent materials and cross-sectional shapes may be different between the temple bodies 42A and 342A and the pressing portion 52A.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A head-mountable display device comprising:
   a frame, the frame comprising:
      a bridge portion extending in a first direction to a first side edge of the bridge portion, and extending in a second direction to a second side edge of the bridge portion;
      a connection portion connected to at least one edge portion of at least one of the first side edge and the second side edge, wherein the connection portion extends in a rearward direction away from the bridge portion along the at least one edge portion; and
      a temple portion rotatably connected to the connection portion, and configured to rotate around a rotation axis extending perpendicularly to the first and second directions;
   an image display unit comprising an optical system and configured to display an image; and
   a retaining mechanism configured to detachably hold the image display unit at the connection portion, wherein the retaining mechanism comprises:
      a first engagement portion connected to the connection portion;
      a second engagement portion positioned adjacent to the image display unit and configured to removably engage the first engagement portion; and
      a pressing portion positioned on the temple portion and configured to press the second engagement portion into the first engagement portion when the second engagement portion is engaged with the first engagement portion and the temple portion is rotated, such that the pressing portion is substantially parallel to the connection portion along the rearward direction.

2. The head-mountable display device according to claim 1, wherein the first engagement portion comprises:
   an extending portion positioned adjacent to the connection portion and having a first side surface and a second side surface that each extend in a forward direction from a rear edge portion of the connection portion; and
   a guide groove extending along at least one of the first side surface and the second side surface of the extending portion, and wherein the second engagement portion comprises:
   a first holding portion configured to hold the first side surface of the extending portion, by contacting the first side surface of the extending portion; and
   a second holding portion configured to hold the second side surface of the extending portion, by contacting the second side surface of the extending portion,
   wherein at least one of the first and second holding portions is configured to fit the guide groove,
   wherein the temple portion comprises a temple connection portion rotatably connected to the rear edge portion of the connection portion surrounding the rotation axis, and
   wherein the pressing portion extends in the forward direction from the connection portion and is configured to press the at least one of the first and second holding portions into the guide groove.

3. The head-mountable display device according to claim 2, wherein the first holding portion is configured to fit the guide groove, and the head-mountable display device further comprises:
an engaging bump; and
an engaging hollow configured to engage the engaging bump, wherein the engaging bump and the engaging hollow are formed between the second holding portion and the second side surface of the extending portion.

4. The head-mountable display device according to claim 3, wherein the engaging bump is formed on the second holding portion, the engaging hollow is formed on the particular surface of the extending portion, and the second holding portion is elastic.

5. The head-mountable display device according to claim 2, wherein the guide groove is formed on the first side surface and the second side surface of the extending portion, and the guide groove comprises an opening portion positioned on a front edge portion of the extending portion, and
wherein the first holding portion and the second holding portion fit within the opening portion, and the guide groove is configured to guide the first holding portion and the second holding portion.

6. The head-mountable display device according to claim 2, wherein the connection portion has a lower surface from which the extending portion projects, the image display unit has an upper surface from which the first and second holding portions project, and when the first and second holding portions hold the first and second side surfaces, respectively, of the extending portion, the image display unit is positioned at an area lower than both the bridge portion and the connection portion.

7. The head-mountable display device according to claim 1, wherein the second engagement portion is configured to be separated from the image display unit.

8. The head-mountable display device according to claim 7, wherein the second engagement portion has a plurality of fitting holes formed therein, and the image display device comprises a boss, and wherein the plurality of fitting holes are positioned at different positions throughout the second engagement portion, and the boss is configured to selectively fit into any one of the plurality of fitting holes.

9. The head-mountable display device according to claim 8, wherein when the second engagement portion engages with the first engagement portion, the plurality of fitting holes are disposed at different positions in an upward and a downward direction.

10. The head-mountable display device according to claim 1, wherein the pressing portion has a pressing surface, and the first engagement portion and second engagement portion have an engagement area at which the first and second engagement portions engage, and an area of the pressing surface is larger than the engagement area.

11. The head-mountable display device according to claim 10, wherein the first engagement portion comprises an extending portion positioned adjacent to the connection portion and having a first side surface and a second side surface that each extend forward from a rear edge portion of the connection portion, and wherein the second engagement portion comprises:
a first holding portion configured to hold the first side surface of the extending portion, by contacting the first side surface of the extending portion; and
a second holding portion configured to hold the second side surface of the extending portion, by contacting the second side surface of the extending portion, wherein the temple portion comprises a temple connection portion rotatably connected to the rear edge portion of the connection portion surrounding the rotation axis,
wherein the pressing portion extends in the forward direction from the connection portion and is configured to press a pressing surface of the first holding portion into the first side surface, and
an area of the pressing surface of the first holding portion is greater than an area of an opposite surface of the first holding portion, wherein the opposite surface is opposite to the pressing portion when the first and second holding portions hold the first and second side surfaces, respectively of the extending portion.

12. The head-mountable display device according to claim 1, wherein the bridge portion and the connection portion are both more rigid than the temple portion, and the bridge portion and the connection portion are configured to reduce deformation when a bending moment around the rotation axis is applied.

13. The head-mountable display device according to claim 1, wherein, when a height is defined as a direction parallel to the rotation axis, a ratio of width to height of a cross-sectional shape of the bridge portion and a ratio of width to height of a cross-sectional shape of the connection portion are both greater than a ratio of width to height of a cross-sectional shape of the temple portion.

14. The head-mountable display device according to claim 1, wherein the image display unit is configured to receive signals from an external apparatus via a cable, and to display an image based on the received signals,
wherein the temple portion further comprises a retaining member attached to the temple portion and configured to retain the cable, and
wherein the retaining member is configured to slide in a forward direction and the rearward direction, along the temple portion.

15. The head-mountable display device according to claim 14, wherein the temple portion has an elongated hole formed therein, the elongated hole being elongated in the forward direction and the rearward direction, and wherein the retaining member comprises:
a sliding portion formed to fit within the elongated hole, wherein the sliding portion has a first side surface and a second side surface opposite the first side surface;
a cable retaining portion formed at the first side surface of the sliding portion, and configured to retain the cable; and
a platelike portion formed at the second side surface of the sliding portion, wherein the platelike portion has a width greater than a width of the elongated hole.

16. The head-mountable display device according to claim 15, wherein the temple portion has an aperture opening formed at a rear edge of the elongated hole, wherein the aperture opening is configured to allow the platelike portion to pass through the aperture opening, and
wherein the retaining member is configured to be removably mounted on the temple portion by inserting the platelike portion through the aperture opening.

17. The head-mountable display device according to claim 15, wherein the platelike portion has a curved sliding surface configured to contact a side surface of the temple portion, and
wherein the curved sliding surface is curved along a direction of the length of the elongated hole, and the curved sliding surface forms a convex shape with respect to the side surface of the temple portion.

18. The head-mountable display device according to claim 17, wherein the side surface of the temple portion is configured to curve when a bending moment is applied around the rotation axis when the temple portion is mounted, and wherein a curvature radius of the curved sliding surface is less than a curvature radius of the side surface of the curved temple portion.

19. The head-mountable display device according to claim 15, wherein the temple portion comprises:
   a temple body extending in the rearward direction from a temple connection portion rotatably connected to the rear edge portion of the connection portion surrounding the rotation axis;
   an ear-mountable portion positioned on a rear edge of the temple body, and
   a cable retaining groove formed on the ear-mountable portion, wherein the cable retaining groove is configured to retain the cable.

20. The head-mountable display device according to claim 19, wherein the elongated hole is formed on the temple body, and wherein the ear-mountable portion extends in the rearward direction and is connected with the temple body at an area lower than the elongated hole.

21. A head-mountable display device comprising:
   a frame, the frame comprising:
      a bridge portion extending in a first direction to a first side edge of the bridge portion, and extending in a second direction to a second side edge of the bridge portion, in front of at least one eye of the user;
      a connection portion connected to at least one edge portion of at least one of the first side edge and the second side edge, wherein the connection portion extends in a rearward direction away from the bridge portion along the at least one edge portion; and
      a temple portion rotatably connected to the connection portion, and configured to rotate around a rotation axis extending perpendicularly to the first and second directions;
   a pressing portion positioned on the temple portion and extending in a forward direction from the connection portion;
   an image display unit comprising an optical system and configured to display an image; and
   a retaining mechanism configured to detachably hold the image display unit between the connection portion and the pressing portion when the temple portion is rotated, such that the pressing portion is substantially parallel to the connection portion along the rearward direction.

* * * * *